(12) United States Patent
Meier et al.

(10) Patent No.: US 10,479,266 B2
(45) Date of Patent: Nov. 19, 2019

(54) MULTIFUNCTION LAMP UNIT AND REAR VIEW DEVICE THEREWITH

(71) Applicant: SMR Patents S.à.r.l., Luxembourg (LU)

(72) Inventors: Eugen Meier, Ditzingen (DE); Oliver Schmidt, Stuttgart (DE); Volker Erhart, Köngen (DE); Raimund Negel, Unterensingen (DE); Arne Schmierer, Kirchheim (DE); Daniel Fritz, Stuttgart (DE); Andreas Herrmann, Winnenden-Baach (DE)

(73) Assignee: SMR Patents S.à.r.l., Luxembourg (LU)

( * ) Notice: Subject to any disclaimer, the term of this patent is extended or adjusted under 35 U.S.C. 154(b) by 27 days.

(21) Appl. No.: 15/956,091

(22) Filed: Apr. 18, 2018

(65) Prior Publication Data

US 2018/0229648 A1    Aug. 16, 2018

Related U.S. Application Data

(63) Continuation-in-part of application No. 15/589,043, filed on May 8, 2017, which is a continuation of
(Continued)

(30) Foreign Application Priority Data

Jan. 24, 2012  (AU) ................................ 2012900267
Feb. 24, 2015  (EP) .................................... 15156407

(51) Int. Cl.
*B60Q 1/26*     (2006.01)
*B60Q 1/28*     (2006.01)
(Continued)

(52) U.S. Cl.
CPC ............. *B60Q 1/2665* (2013.01); *B60Q 1/28* (2013.01); *B60Q 1/38* (2013.01); *B60R 1/06* (2013.01);
(Continued)

(58) Field of Classification Search
CPC .... B60R 2001/0011; B60R 2001/1253; B60Q 1/2665; B60Q 2400/40; B60Q 2400/50;
(Continued)

(56) References Cited

U.S. PATENT DOCUMENTS 6,586,098 B1 *   7/2003   Coulter ................. C09C 1/0015
                                                          428/403
8,764,256 B2 *   7/2014   Foote ........................ B60R 1/12
                                                          362/494
(Continued)

OTHER PUBLICATIONS

C. Gargori et al., Iron and Chromium Doped Perovskite (CaMO3 M = Ti, Zr) Ceramic Pigments, Effect of Mineralizer, Aug. 2012, Elsevier, vol. 38, Issue 6, pp. 4453-4460 (Year: 2012).*
(Continued)

*Primary Examiner* — Sean P Gramling
*Assistant Examiner* — Keith G. Delahoussaye
(74) *Attorney, Agent, or Firm* — Jones Day

(57) ABSTRACT

A multifunctional lamp unit includes a side turn indicator including a housing for at least one light conductor with at least one illuminant, and a projection unit. A rearview device including the multifunctional lamp unit, a method of operating the rearview device, and a vehicle including the rearview device are also described.

71 Claims, 10 Drawing Sheets

Related U.S. Application Data application No. 15/052,120, filed on Feb. 24, 2016, now Pat. No. 9,643,532, and a continuation-in-part of application No. 15/439,188, filed on Feb. 22, 2017, which is a continuation-in-part of application No. 14/936,024, filed on Nov. 9, 2015, now Pat. No. 9,656,601, which is a continuation-in-part of application No. 14/374,376, filed as application No. PCT/AU2013/000047 on Jan. 24, 2013, now Pat. No. 9,181,616.

(51) Int. Cl.

| | | |
|---|---|---|
| *B60Q 1/38* | (2006.01) | |
| *B60R 1/12* | (2006.01) | |
| *F21S 43/20* | (2018.01) | |
| *F21S 43/235* | (2018.01) | |
| *B60R 1/06* | (2006.01) | |
| *F21S 43/14* | (2018.01) | |
| *F21S 43/145* | (2018.01) | |
| *F21S 43/237* | (2018.01) | |
| *F21S 43/245* | (2018.01) | |
| *F21Y 113/20* | (2016.01) | |
| *F21W 103/25* | (2018.01) | |
| *F21W 103/60* | (2018.01) | |

(52) U.S. Cl.
CPC ............ *B60R 1/1207* (2013.01); *F21S 43/14* (2018.01); *F21S 43/145* (2018.01); *F21S 43/235* (2018.01); *F21S 43/237* (2018.01); *F21S 43/245* (2018.01); *F21S 43/26* (2018.01); *B60Q 2400/40* (2013.01); *B60Q 2400/50* (2013.01); *B60R 2001/1253* (2013.01); *F21W 2103/25* (2018.01); *F21W 2103/60* (2018.01); *F21Y 2113/20* (2016.08)

(58) Field of Classification Search
CPC ........... F21W 2013/00; F21W 2013/20; F21W 2013/25; F21W 2013/50; F21W 2013/60; F21S 43/235; F21S 43/237
USPC .......................................................... 362/494
See application file for complete search history.

(56) References Cited

U.S. PATENT DOCUMENTS

| | | | | |
|---|---|---|---|---|
| 2004/0114262 | A1* | 6/2004 | Boddy | B60R 1/12 359/877 |
| 2007/0053195 | A1* | 3/2007 | Alberti | B60Q 1/2665 362/494 |
| 2008/0212189 | A1* | 9/2008 | Baur | B32B 17/10174 359/604 |
| 2011/0273671 | A1* | 11/2011 | Chu | G03B 21/14 353/13 |
| 2013/0120130 | A1* | 5/2013 | Cha | B60R 3/02 340/468 |
| 2013/0242586 | A1* | 9/2013 | Huizen | B60R 1/12 362/494 |
| 2014/0320823 | A1* | 10/2014 | Ammar | B60R 1/12 353/13 |
| 2017/0066386 | A1* | 3/2017 | Sawada | B60R 11/0229 |

OTHER PUBLICATIONS

P. Ghosh et al., HCP to Omega Martensitic Phase Transformation Pathway in Pure Zr., Feb. 2013, Journal of Alloys, Conference: Solid State Physics Symposium 2013 (Year: 2013).*

* cited by examiner

MULTIFUNCTION LAMP UNIT AND REAR VIEW DEVICE THEREWITH

CROSS-REFERENCE TO RELATED APPLICATIONS

This application is a continuation-in-part of U.S. patent application Ser. No. 15/589,043, filed May 8, 2017, which is a continuation-in-part of U.S. patent application Ser. No. 15/052,120 and now issued as U.S. Pat. No. 9,643,532, filed Feb. 24, 2016, which claims the benefit of foreign priority to European Patent Application No. 15156407.7, filed Feb. 24, 2015; and which also is a continuation-in-part of U.S. patent application Ser. No. 15/439,188, filed Feb. 22, 2017, which is a continuation-in-part of U.S. patent application Ser. No. 14/936,024, filed Nov. 9, 2015 and now issued as U.S. Pat. No. 9,656,001, which is a continuation-in-part of U.S. patent application Ser. No. 14/374,376, filed Jul. 24, 2014 and now issued as U.S. Pat. No. 9,181,616, which is a national stage entry of International Patent Application No. PCT/AU2013/000047, filed Jan. 24, 2013, which claims the benefit of foreign priority to Australian Patent Application No. 2012900267, filed Jan. 24, 2012, each of which is hereby incorporated by reference in its entirety for all purposes.

STATEMENT REGARDING FEDERALLY SPONSORED RESEARCH OR DEVELOPMENT

Not applicable.

REFERENCE TO A COMPACT DISK APPENDIX

Not applicable.

BACKGROUND

1. Field

The following description relates to a multifunction lamp for motor vehicles and view devices such as mirrors or camera pods. Different functions and devices may be incorporated into and/or controlled with the help of rear view devices.

2. Description of Related Art

A lamp for vehicles, especially for side-view mirrors or other viewing means, is described in European Patent No. 1 657 488 B 1. In this lamp, a weld seam or an adhesive seam inseperably connects a substantially U-shaped front housing part, which is configured as a transparent clear lens, to a back panel in order to provide a closed, watertight housing within which at least one illuminant is arranged. The housing components are described as made of hard plastics, preferably polymethyl methacrylate (PMMA) or plastics of this family. The back panel can also be made of another plastic, such as polycarbonate (PC), polybutylene terephthalate (PBT) or the like.

Another such lamp is described in European Patent No. 1 852 306 B1, in which an illuminant, the outside, or the inside of a U-shaped front housing part features a lens system. The lens system is in the form of a surface texturing for the focusing, parallel direction, or scattering of the emitted light.

The construction of these known lamps is expensive. In addition, welding processes negatively affect the tolerances of adjacent clearances. The necessity of a weld seam or adhesive seam also limits the design of the lamps, as with a blinker in a side-view mirror arrangement of a vehicle.

German Patent Application No. 10 2011 103 200 A1 describes a light window for an illuminated unit in a side-view mirror where the light window fits the outer contour of the housing of the side-view mirror and seals an opening in the housing of the side-view mirror. The light window serves as a light conductor and features outcoupling structures on at least one area. The light window is produced out of an optical film which has a molded coating and is configured as a light conductor, where the optical film contains at least one outcoupling structure. A crystal-clear base material or, alternatively, a colored transparent material can be used for production and it can be produced in a single extrusion die. To produce the light window, the optical film is placed into the extrusion die so that a protective layer is injected on the die side of the film and the coating is injected on the core side of the film. The protective layer can be made of PC film and the coating can be made of PC or PMMA.

Molding a coating on a film to produce a light window, such as a blinker, is complicated particularly since a fastening on a housing is also needed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In an aspect, an advantage is provided in functions and devices to enhance, extend and/or sustain the functionality of the rear view device during normal or extreme conditions. This may include heating and/or cooling means, cleaning means such as wipers, liquid and/or gaseous sprays, actuator means for moving the rear view device or parts of it, such as for example a display, a camera system and/or parts of a camera system including, for example, lenses, filters, light sources, adaptive optics like deformable mirrors, sensors and/or mirrors, and/or actuator means for inducing movement of other objects, for example parts of the vehicle and/or objects surrounding the vehicle. Furthermore, it may include linear tracks and/or rotating wheels such as a filter wheel, for exchanging optical elements, including lenses, mirrors, light sources, sensors, adaptive optics like deformable mirrors, filters, and/or other optical elements.

Some examples for functions and devices incorporated into or controlled with the help of rear view devices include illumination devices such as any kind of light module like an external light module, an internal light module, a front light, a back light, a fog light, a brake light, an acceleration light, a turn signal, a logo lamp, a puddle light, a flash light, a navigation light, a position light, an emergency light, a spotlight, a green light, a red light, a warning light, a turn signal light module, an approach light, a search light, an information light, a display and/or any combination thereof.

Further examples for functions and devices incorporated into or controlled with the help of rear view devices include a tiredness detection system, a microsleep detection system, a distance and/or velocity determination system, such as a LIDAR (Light detection and ranging) system, a blind spot indicator system, a lane change assistant system, a navigation assistant system, a tracking assistant system, a human-machine interaction system, a machine-machine interaction system, an emergency and precaution assistant system like an accident avoiding assistant system, a counter-measures assistant system, a brake assistant system, a steering assistant system, an acceleration assistant system, an escape assistant system, including, for example, an ejection seat system, a direction indicator, a blind spot indicator, an approach system, a strong braking system, an emergency braking system, a charging status indicator, a vehicle mode system, comprising for example a sports mode system, an economy mode system, an autonomous drive mode system, a sleep mode system, an anti-theft system, a vehicle locked indicator system, a vehicle stolen indicator, a warning signal system, a temperature indicator system, a weather indicator system, a traffic light signal system, a fuel status system, and/or any combination thereof.

In an aspect, a method for manufacturing a lamp for vehicles overcomes the disadvantages of the state of the art. For example, a lamp should be easy to manufacture and offer large freedom of design with high light yield.

In an aspect, a multifunction lamp unit for a vehicle includes a housing, at least one light conductor together with at least one illuminant provided by at least one LED on a printed circuit board, at least one light foil, and a clear lens.

The unit may be produced out of plastic in a 3-component injection procedure, wherein the refractive index of the plastic of the clear lens is selected to be different from the refractive index of the plastic of the light conductor, the boundary between the clear lens and the at least one light conductor adjacent to it is at least partly formed with a structure.

The light foil is arranged at least partly between the clear lens and at least a part of the at least one light conductor.

At least one light conditioning area, such as for tinting, dying, reflecting, scattering or the like, is introduced into at least one of the at least one light conductor and the clear lens by choosing at least one additive for the respective plastic.

The housing may be formed with a first recess to build an installation space for at least one illuminant, wherein the first recess is sealed.

The housing may be formed with a second recess to build an installation space for a control unit, wherein the second recess is sealed.

The control unit may be connected to at least one of the at least one illuminant, the light foil and the vehicle.

The light foil may extend along at least a part of the clear lens.

The at least one light coupling area may be provided at a first end of a first light conductor facing the installation space or a first end of a second light conductor extending along a region of the light foil.

Each light conductor may be enclosed by the housing and the clear lens.

The light rays from a first illuminant may be subjected to a total reflection at the boundary between the first light conductor and the clear lens outside at least one light decoupling area.

The light rays from a second illuminant may be decoupled along at least a part of the extent of the second light conductor.

The light rays decoupled from the second light conductor may pass at least one of the light foil, the clear lens, and the housing.

The light rays decoupled from the second light conductor may pass an opening in at least one of the light foil and the housing.

The light rays from a third illuminant may be coupled at a first end of a third light conductor and decoupled at the second end of the third light conductor.

There may be a plurality of light decoupling regions provided by at least one of the clear lens and the housing.

There may be a plurality of at least one of light decoupling directions and light decoupling ranges.

There may be a plurality of light decoupling regions, with light having different characteristics being decoupled from the different decoupling regions.

The clear lens may be made out of a polymeric substrate, where the polymeric substrate is coated with a chromium-based reflective coating, and the polymeric substrate and the chromium-based reflective coating are at least in part permeable to light originating from at least one of the light foil and the at least one illuminant.

The coating may be an alloy of chromium and a dopant material, the dopant material being selected from the hexagonally close-packed transition metals, the alloy having a crystal structure of a primary body-centered cubic phase in coexistence with a secondary omega hexagonally close-packed phase.

The polymeric substrate may include a polymeric light pipe into which light from a fourth illuminant is coupled.

The alloy may be a binary alloy of chromium and the dopant material.

The atomic percentage of the dopant material in the binary alloy may range from about 1.9 at. % to about 5.8 at. %.

The dopant material may be selected from hexagonally close-packed transition metals zirconium, titanium, cobalt, hafnium, rubidium, yttrium and osmium.

The dopant material may be selected from hexagonally close-packed transition metals zirconium, titanium and cobalt.

The alloy may be a binary alloy and the dopant material may be zirconium where the atomic percentage of the zirconium in the binary alloy may be in the range of from about 4.5 at. % to about 5.8 at. %.

The alloy may be a binary alloy and the dopant material may be titanium, and where the atomic percentage of the titanium in the binary alloy may be in the range of from about 1.9 at. % to about 5.8 at. %.

The alloy may be a binary alloy and the dopant material may be cobalt, where the atomic percentage of the cobalt in the binary alloy may be in the range of from about 1.9 at. % to 5.7 at. %.

The coating may have a thickness of 200 nm, 100 nm, be in the range of from 40 nm to 80 nm, be in the range of from 50 nm to 70 nm, or be about 60 nm.

The polymeric substrate may be formed from a material selected from the group of polyacrylate, polyester, polystyrene, polyethylene, polypropylene, polyamides, polyamides, polycarbonate, epoxy, phenolic, acrylonitrile-butadiene-styrene, acrylonitrile-styrene-arylates, acetal and blends of these.

The polymeric substrate may be formed from a material selected from the group of polycarbonate, poly(2,2'-dihydroxyphenylpropane) carbonate, polydiethyleneglycol bis (allyl carbonate), polymethylmethacrylate and polystyrene, or blends thereof.

The polymeric substrate may include a pre-coated film in the form of either a hardcoat, an inorganic oxide, or a thin metal film, or a combination of such pre-coated films.

A rear view device of a vehicle may include the multifunction lamp unit.

The illuminant and the light foil may fulfill different light functions.

At least two illuminants may fulfill different light functions.

The rear view device may further include a head moveable relative to the vehicle, with the head including at least one casing part providing at least one opening for the multifunction lamp unit.

The clear lens may extend along the casing part.

The clear lens may be connected at least to the casing part.

The casing part may be provided by a bezel.

The rear view device may include at least one of a camera and a reflective element.

The camera may be arranged within the head.

The rear view device may further include at least one light decoupling region providing at least one of a turn light indicator, a blind spot indicator, a puddle light, a logo light and an approach light.

In another aspect, a multifunctional side turn indicator lamp unit includes a side turn indicator having a housing for at least one light conductor with at least one illuminant; and a projection unit.

The illuminant may include at least one of an LED on a printed circuit board (PCB) and a laser diode and one light foil.

A light source for emitting yellow or amber light may be provided by the illuminant for both the side turn indicator and the projection unit.

The projection unit may include either a light source for emitting white light or two light sources, one for emitting yellow or amber light and another one for emitting white light.

Either the illuminant may include one or more light sources combined physically or electrically with the projection unit, or the projection unit may include one or more light sources either combined physically or electrically with the side turn indicator.

In case at least one clear lens is used with the side turn indicator lamp unit, the side turn indicator lamp unit, including the clear lens and the at least one light conductor, may be produced out of plastic in a 3-component injection procedure, where the refractive index of the plastic of the clear lens is selected to be different from the refractive index of the plastic of the at least one light conductor, and the boundary between the clear lens and the at least one light conductor adjacent to it is at least partly separated by a structure.

In yet another aspect, a rear view device of a vehicle includes a multifunction lamp unit in form of the multifunctional side turn indicator lamp unit.

The rear view device may include at least one casing part providing at least one opening or window for light emitted by the multifunction lamp unit. In case there are at least two casing parts they may provide at least one opening or window there between for light emitted by the multifunction lamp unit.

In case the rear view device has a head moveable relative to the vehicle, the head may include the at least one or two casing parts.

The at least one or two casing parts may be opaque and each window may be transparent.

The at least one casing part and one window may be produced out of plastic in a 2-component injection procedure.

The at least one window may be made of clear or tinted polymethylmethacrylate (PMMA) or polycarbonate (PC).

The at least one opaque casing part may be made of acrylonitrile butadiene styrene (ABS), polypropylene (PP) or high-density polyethylene (HDPE).

The clear lens may extend along the at least one or two casing parts and/or be connected to at least the at least one or two casing parts.

The rear view device may further include at least one of a camera and a reflective element, and/or at least one light decoupling region providing at least one of a blind spot indicator, a puddle light, a logo light and an approach light, in addition to a side turn indicator light, where the projection unit preferably provides either a side turn indicator light or a logo light.

The at least one casing part may be a scalp part.

The multifunction lamp unit may be mounted to at least one casing part, with preferably at least one PCB of the multifunction lamp unit being mounted to at least one casing part.

A cooling element may be provided, where the at least one PCB of the multifunction lamp unit may be connected to the cooling element.

The above embodiments each allow for a particularly simple and cost effective manufacturing of the rear view device. In case the window for the multifunction lamp unit is solidly connected with a casing part body, it is also particularly stable against mechanical stresses, for example vibrations or shock stresses caused by the movement of a vehicle carrying such a rear view device.

At least one window may be made of clear or tinted polymethylmethacrylate (PMMA) or polycarbonate (PC). This allows for the unhindered passage of light from the multifunction lamp unit. Moreover, both polymers are also mechanically stable and resistant against heat, UV-degradation and scratches.

The opaque housing part body may be made of acrylonitrile butadiene styrene (ABS), polypropylene (PP) or high-density polyethylene (HDPE). In this manner, a mechanically stable and warp resistant housing part may be provided.

The at least one housing part may be a scalp part of the mirror housing. The scalp of the mirror housing may be the upper housing part. Alternatively, the window can also be arranged in a lower housing part of the mirror housing, sometimes called the "sword". Both alternatives allow for an unhindered emission of light from the multifunction lamp unit in the desired directions.

The at least one housing part may be formed integrally with a cover part for a side turn indicator light. A rear view device formed in this way includes a low number of parts and therefore is cost-effective to manufacture and easy to assemble.

The multifunction lamp unit may be fixed relative to the window by means of clips, screws or the like. This allows for an exact adjustment of the multifunction lamp unit, so that the desired lighting effect can be achieved easily.

In a further aspect, a rear view device of a vehicle includes a multifunction lamp unit as described above, where the at least one illuminant includes a projection unit which is adapted to project a symbol onto a road surface and where the rear view device further includes at least one of a turn light indicator, a warning light, a blind spot indicator, a puddle light, a logo light, a welcome light and an approach light; a rear view device actuating unit configured to move the rear view device in a first direction and in a second direction by driving at least one motor, where the rear view device moves in the first direction toward a first position where the rear view device can observe the rear, and the rear view device moves in the second direction toward a second position where the rear view device cannot observe the rear; a control unit configured to receive information about at least one of a state of the rear view device actuating unit and a position of the rear view device, and to instruct the projection unit to change a state of the projection in response to the rear view device being moved based on the received information.

In this manner, the rear view device and the multifunction lamp unit may provide different functions and information depending on the position of the rear view mirror, enhancing their functionality and usefulness. The control unit may receive the information about the state of the actuating unit or the position of the rear view device directly from the actuating unit, via separate sensors, and/or via control signals from a bus system such as a LIN-bus or CAN-bus.

The control unit may be configured to instruct the projection unit to project a turn signal indication symbol onto the road surface in response to the rear view device being in the first position and the control unit receiving a signal indicating an actuation of a turn signal switch. By projecting the turn signal indication symbol, the intent of a driver to turn a vehicle with such a rear view device is made visible to other road users or pedestrians, even if their view of the vehicle's normal turn signal lights is obstructed. This improves traffic safety.

The control unit may be configured to instruct the projection unit to project a logo such as a manufacturer's logo, onto the road surface when the rear view device is in the second position. In the second position of the rear view device, i.e. its folded state, the projection of turn signal indicator symbols is unnecessary since the folded state is usually only adopted in a parked position of the vehicle.

The control unit may be configured to activate the turn light indicator when the rear view device is in the second position and the control unit receives a signal indicating an actuation of a turn signal switch. This allows for signaling the intent to turn even if the rear view device is accidentally or deliberately left in its folded state.

The control unit may be configured to activate the puddle light and/or the logo light when the rear view device is in the second position. Since the second, folded position of the rear view device is usually adopted when the vehicle is parked, the illumination of the immediate environment of the vehicle can assist the driver in entering or leaving the vehicle and helps to alert other traffic participants that a door of the vehicle is likely to be opened, thereby improving traffic safety.

In yet another aspect, a method is provided for operating the rear view device of a vehicle including a multifunction lamp unit as described above, where the at least one illuminant includes a projection unit which is adapted to project a symbol onto a road surface and wherein the rear view device further includes at least one of a turn light indicator, a warning indicator, a blind spot indicator, a puddle light, a logo light, a welcome light, and an approach light, and a rear view device actuating unit configured to move the rear view device in a first direction and in a second direction by driving at least one motor, where the rear view device moves in the first direction toward a first position where the rear view device can observe the rear, and the rear view device moves in the second direction toward a second position where the rear view device cannot observe the rear; wherein a state of the projection of the projection unit is changed when the rear view device is being moved.

It should be appreciated that the advantages of this aspect of the invention and of its embodiments correspond at least to the advantages of the rear view device as detailed above.

The projection unit may project a turn signal indication symbol onto the road surface in response to the rear view device being in the first position and a signal from a turn signal switch being received.

A logo, such as a manufacturer's logo, may be projected onto the road surface in response to the rear view device being in the second position.

The turn light indicator may be activated when the rear view device is in the second position and a signal indicating an actuation of a turn signal switch is received.

The puddle light and/or the logo light may be activated when the rear view device is in the second position.

The color of the projection by the projection unit may be changed when the rear view device changes its state. This allows for an easy distinction whether a projected symbol is relevant for traffic, e.g. a turn signal, or merely decorative, like a logo.

The projection unit may be deactivated when a hazard light is activated. This minimizes the possible distraction of other traffic participants from the hazard light, so that they are more likely to be aware of a dangerous situation, thus improving traffic safety.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

Figure 1:
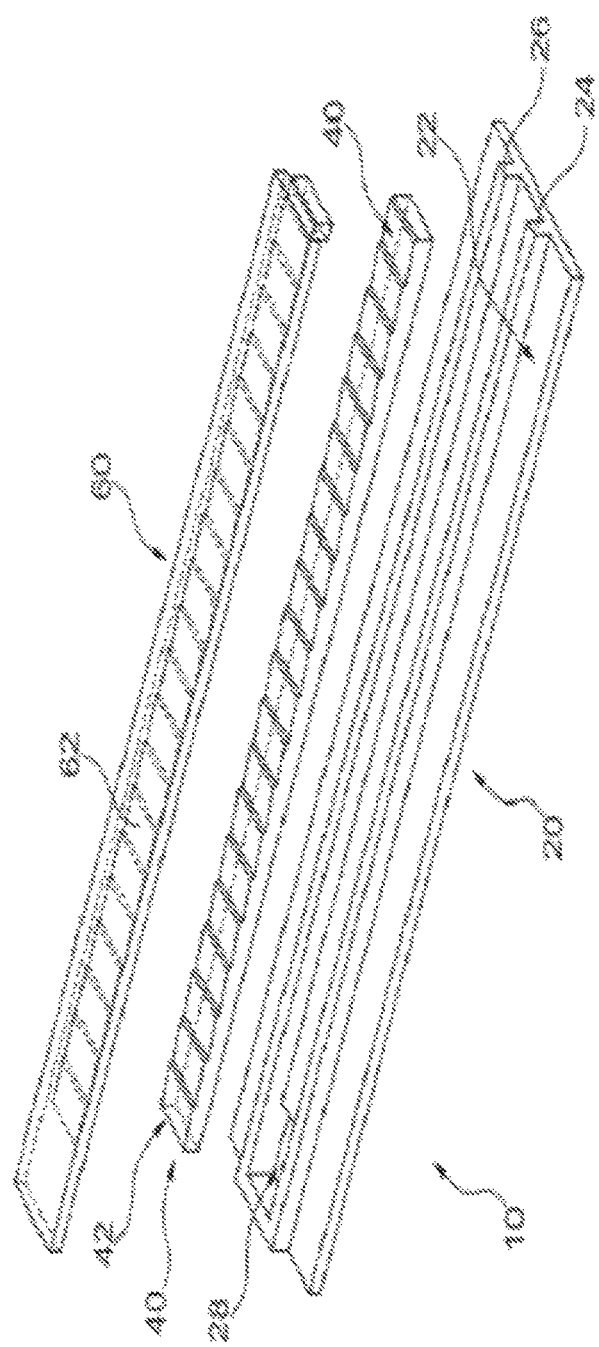
FIG. 1 is a diagram illustrating a housing, a light conductor and a clear lens of a lamp produced according to an embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The term "rearview" is herein defined as a view of the surrounding area, which is not in the field of view of the driver, i.e. the directions opposing, left, right, below and above of the viewing direction, but can also comprise the view in the direction of the viewing direction of the driver and/or any combinations of the directions.

The term "driver" and "driver of the vehicle" relates to the person controlling the main parameters of the vehicle, such as for example direction, speed and/or altitude, e.g. normally the person located in the location specified for the controlling person, for example a seat, but can also relate to any other person or entity within or outside of the vehicle.

The term "entity" relates here to any biological and non-biological life form, material and/or machine, which can gather the signals with which the vehicle is conveying information and/or induces some kind of action based on this signals. This may include a device, such as a mechanical, electromechanical, electronic, electromagnetic, optical, chemical or biological device and/or any combination thereof, for example a computer, a robot, an artificial intelligence, but also an animal and/or a plant.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity and are not intended to limit the scope of the invention or the appended claims. Further, it should be understood that any one of the features can be used separately or in combination with other features. Other systems, methods, features, and advantages of the invention will be or become apparent to one with skill in the art upon examination of the detailed description. It is intended that all such additional systems, methods, features, and advantages be included within this description, be within the scope of the present invention, and be protected by the accompanying claims.

As illustrated in FIG. 1, a lamp 10 includes a housing 20, a light conductor 40, and a clear lens 60. Although not illustrated, a light foil may be arranged within the lamp 10 in accordance with the description of this application. Details related to the light foil are provided at least in reference to FIGS. 6-13 and their accompanying description. These three components are manufactured in an injection molding process. For example, the light conductor 40 can be produced out of PC in a first phase, the clear lens 40 out of crystal-clear or tinted PMMA in a second phase, and the housing 20 out of ABS (acrylonitrile-butadiene-styrene) in a third phase. As a result, one unit is formed, for example, as illustrated in FIGS. 2 and 3 in longitudinal section and cross-section, respectively.

Figure 3:
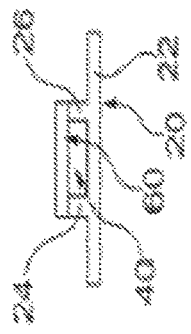
FIG. 3 is a diagram illustrating a cross-sectional view along the line A-B in FIG. 2.
Figure 2:
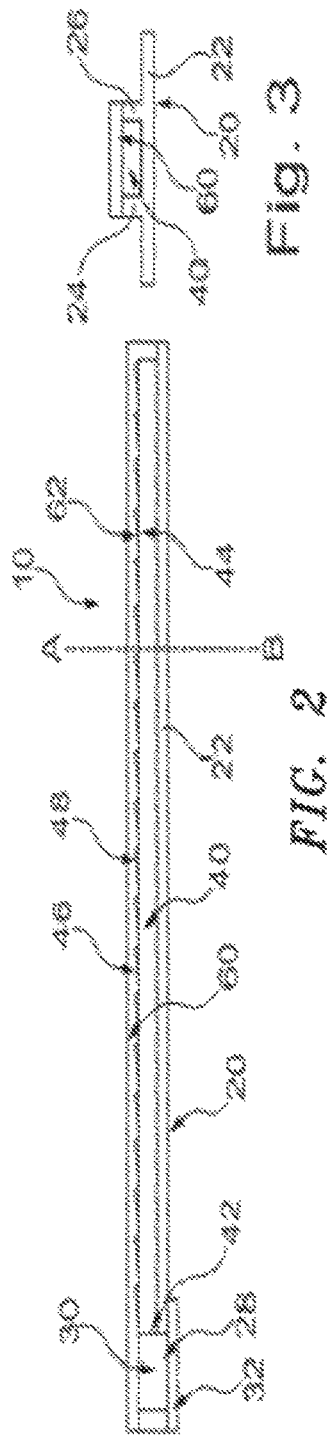
FIG. 2 is a diagram illustrating the light from FIG. 1 as a unit in longitudinal section.

Still referring to FIGS. 1-3, the housing 20 is formed with a back panel 22 and two webs 24 and 26 to receive the light conductor 40 between the webs 24 and 26 on the back panel 22. In addition, a recess 28 which builds an installation space 30 for an illuminant, which is not illustrated, is provided in the housing 20. The illuminant can include an LED on a printed circuit board, and the installation space 30 together with all plug boxes can be sealed by a lid 32.

The light conductor 40 features one end having at least one light incoupling area 42 adjacent to the installation space 30. Its surface, which borders the lower surface of the clear lens 60, can be provided with a lens system 44 which provides the total reflection areas 46 and outcoupling area 48 for the light that enters the light conductor 40 at each incoupling area 42. Because the clear lens 60 is formed with a corresponding lens system 62 on its surface opposite the lens system 44 of the light conductor 40, and also because the refractive indexes of the plastics of the clear lens 60 and of the light conductor 40 differ, total reflection at the outcoupling areas 48 is excluded.

Figure 4:
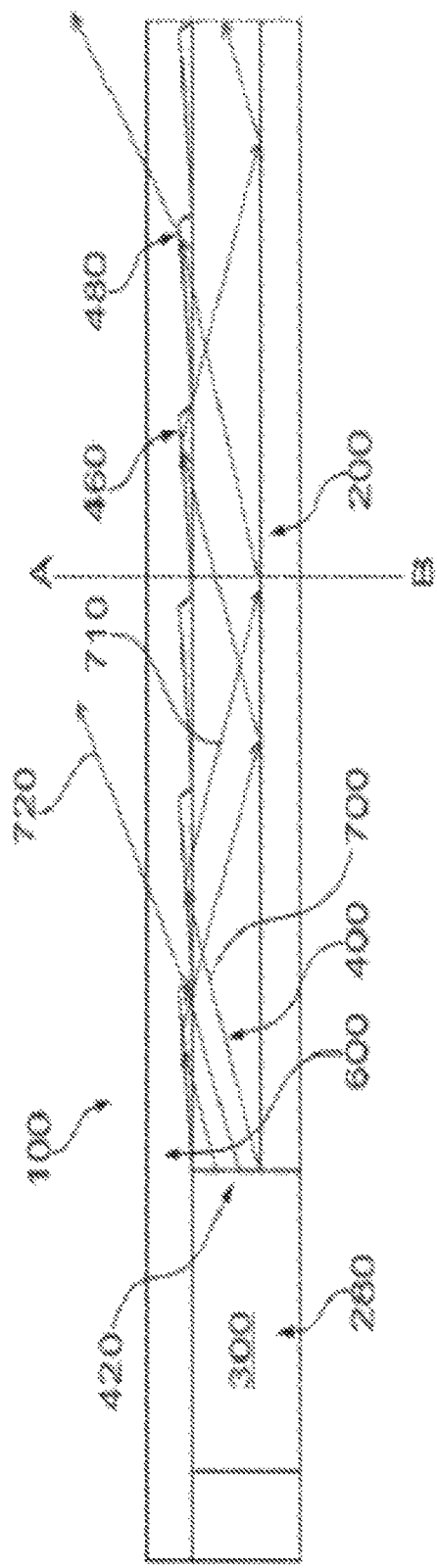
FIG. 4 is a diagram illustrating a part of an alternative lamp in longitudinal section.

The optical path within a lamp produced according an example of the invention will be explained in more detail below in reference to FIGS. 4 and 5. The illustrated lamp 100 differs from the lamp 10 due to a different geometry for the light, whereas the light conductor 40 of the lamp 10 has a rectangular shaped cross section.

Figure 5:
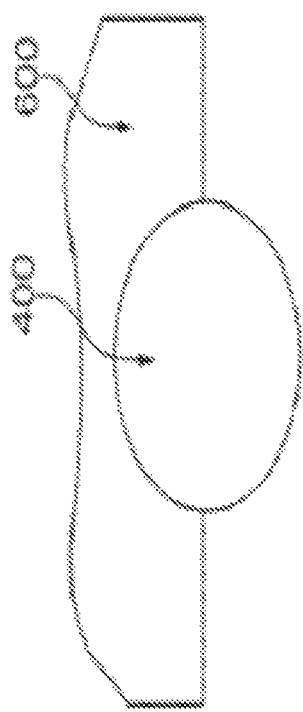
FIG. 5 is a diagram illustrating a cross-sectional view along the line A-B in FIG. 4.

To be enclosed between the back panel 22, the webs 24 and 26 of the housing 20, and the clear lens 60, the light conductor 400 of the lamp 100 has a circular cross section, as illustrated in FIG. 5. In addition, the shape of the housing 200 and the clear lens 600 of the lamp 100 of FIGS. 4 and 5 is also adapted to have this circular shape.

The housing 200 is again configured into an installation space 300 for an illuminant by means of a recess 230.

The light conductor 400 in turn features incoupling areas 420 for light rays from the illuminant, these light rays propagating in the form of the light rays 700 in the light conductor 400 in order to be deflected into the total reflecting light rays 710 at the total reflection areas 460 and into the light rays 720 leaving the lamp 100 at the outcoupling areas 480.

The shape of the clear lens 600 is adapted not only to the shape of the light conductor 400, but can also satisfy any design requirements on the lamp 100. For example, the surface can feature a wave form as illustrated in FIG. 5.

Figure 6:
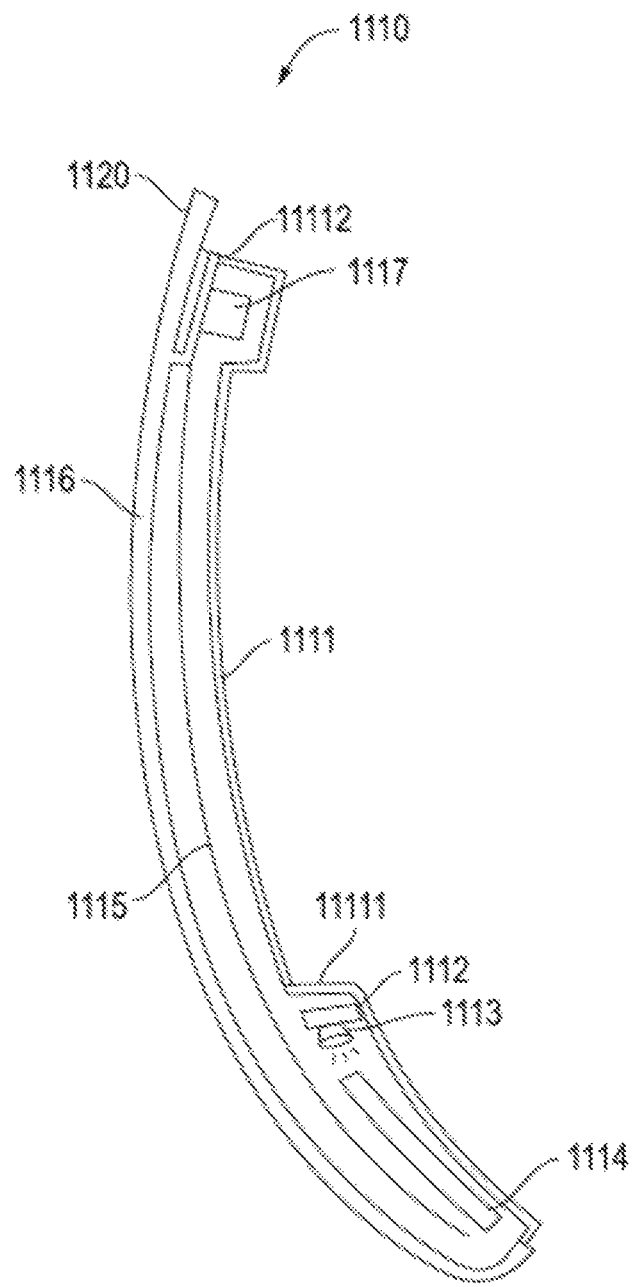
FIG. 6 is a diagram illustrating a cross section of another embodiment of a multifunction lamp unit making use of a light foil.

Referring now to FIG. 6, a cross section of another embodiment of a multifunction lamp unit 1110 making use of a light foil 1115 is illustrated. The lamp unit 1110 is provided as a single module which can be easily installed in a rear view device of a vehicle. Such a rear view device can include at least one reflective element and/or camera. The outer surface of the module is adapted to the contour of the rear view device into which it is to be installed. Further details on such an adaption are, in particular, described in U.S. Pat. No. 8,950,914 B2 which is incorporated herein by reference in its entirety.

The lamp unit 1110 includes a housing 1111 with a first recess 11111 for housing a first illuminant or light source with a printed circuit board 1112 carrying an LED 1113. Light emitted from the first light source 1112, 1113 is coupled into a first light conductor 1114, with the respective light being decoupled from the first light conductor 1114 at one end of the lamp unit 1110.

The lamp unit 1110 further includes a second light source in the form of a light foil 1115. Such light foils are known in the form of, for example, light tapes of the company Light Tape Limited or in the form of a printed lighting as distributed by the company Center of Process Innovation Limited. Making usage of such a light foil 1115 reduces the overall weight of the lamp unit 1110 and enables the production of smaller modules. Still further, the use of light foils 1115 allows in-process integration as it can be inserted into a mould and over-mould.

The light foil 1115 extends along a light window 1116 which is provided as a lid for the housing 1111. The connection between the light window 1116 and the housing 1111 is suited to provide a sealed module which is beneficial when used in an external rear view device.

Still further, the light foil 1115 is connected with a control unit 1117 arranged within a second recess 11112 of the housing 1111. This control unit 1117 may also be connected to the printed circuit board 1112 and a control device within the vehicle to which the rear view device with the lamp unit 1110 is attached.

As depicted in FIG. 6, the light foil 1115 extends from one end of the lamp unit 1110 to the other end thereof and, thus, overlaps the first light source 1112, 1113 and the first light conductor 1114. The light foil 1115 runs parallel to the interior surface of the light window 1116.

The light window 1116 is acting as a clear lens and is connected to a casing part 1120 of the rear view device as described in U.S. Pat. No. 8,950,914 B2.

From the outside of the lamp unit 1110 of FIG. 6, a viewer can only see the light foil 1115 through the light window 1116, whereas the first light source 1112, 1113 and the first light conductor 1114 are hidden. In order to also hide the light foil 1115 when it is not lit, the light window 1116 can be coated with a chromium-based reflective coating which is translucent. In fact, it is preferred to produce the light window 1116 from a polymeric substrate coated with a chromium-based reflective coating as described in U.S. patent application Ser. No. 14/936,024, which is incorporated herein by reference in its entirety.

Figure 8:
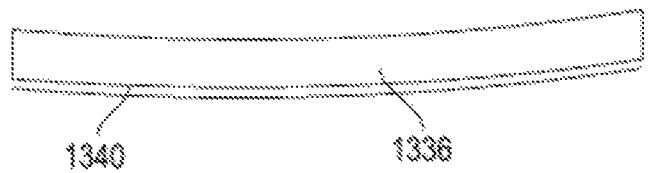
FIG. 8 is a diagram illustrating a cross section of a clear lens with a chromium-based coating.

FIG. 8 depicts a polymeric substrate in the form of a clear lens 1336 or light window provided with a coating 1340. The coating 1340 is at least in part permeable to light originating, for example, from a light foil placed behind the clear lens 1336.

Thus, it is possible to hide both light sources shown in FIG. 6, i.e. the printed circuit board 1112, the LED 1113 and the light foil 1115, and to hide the light conductor 1114 by making usage of the lens 1336 together with the coating 1340 instead of the light window 1116. The light unit 1110 can be integrated into a casing with a metallic coating such that the whole surface will have an appealing metallic look. As soon as the light foil 1114 is lit, respective light rays will pass not only through the lens 1336 but also through the chromium-based coating 1340 thereon. But the first light source 1112, 1113 and the first light conductor 1114 will remain hidden.

Figure 9:
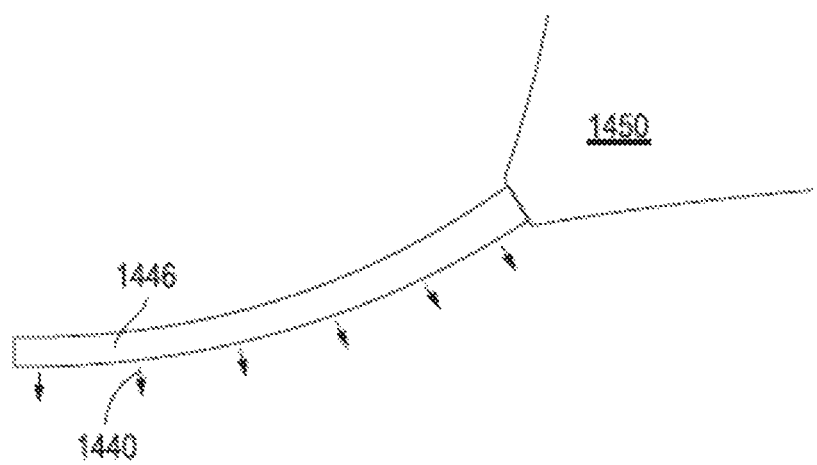
FIGS. 9, 10, 11, 12, and 13 are diagrams illustrating cross sections of the multifunction lamp units together with the decoupled light rays and/or light cones being shown.

FIG. 9 illustrates light rays 1440 emitted from a light foil within a lamp unit 1446 as well as a light cone 1450 decoupled from a light conductor into which light from an LED is coupled in line with the embodiment of FIG. 6. Different functions can be fulfilled by said light rays 1440 and said light cone 1450.

For example, the lamp unit 1416 can be a turn signal indicator module of a rear view device of a vehicle, in particular an exterior mirror, such that the light cone 1450 has to fulfill the ECE (Economic Commission for Europe) regulations ensuring that a region beginning from 5° from the longitudinal axis of the vehicle, up to 60° to the longitudinal axis of the vehicle in the opposite direction of movement is lit up. The light rays 1440 could provide a decorative effect or additional warning effect.

Figure 7:
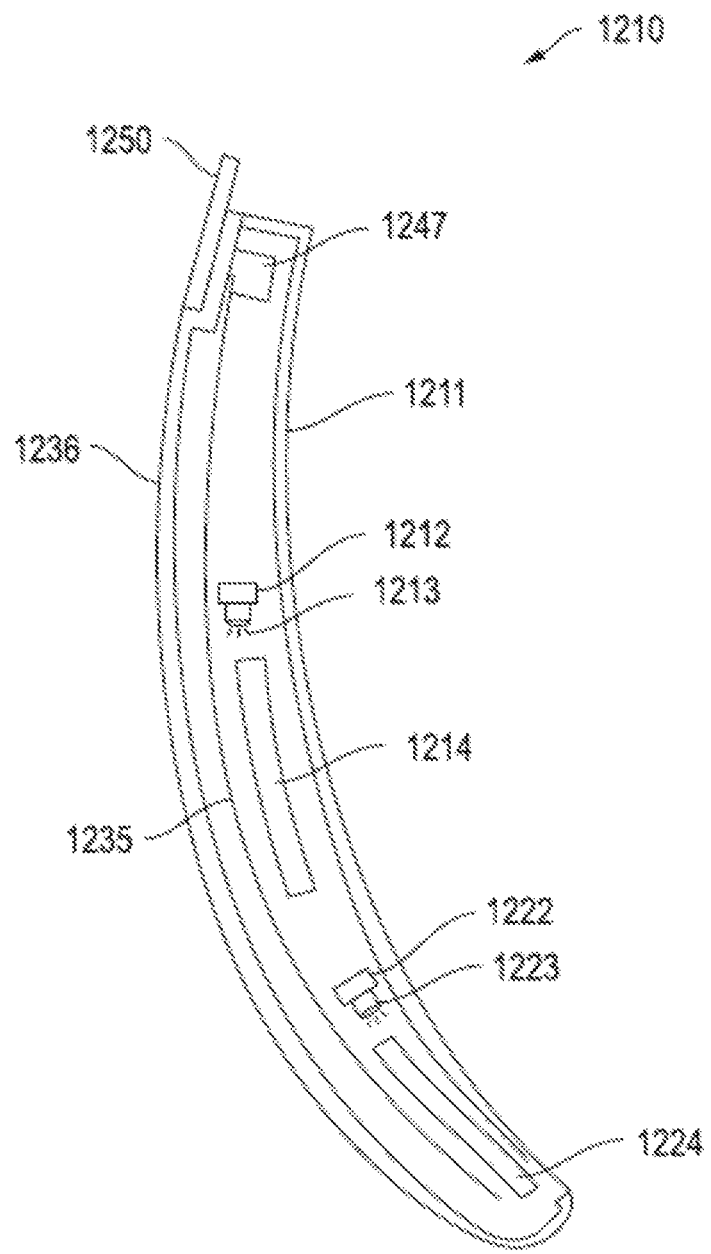
FIG. 7 is a diagram illustrating a cross section of yet another embodiment of a multifunction lamp unit making use of a light foil.

FIG. 7 shows an alternative embodiment of a multifunctional lamp unit 1210 of the invention which, in contrast to the lamp unit 1110 of FIG. 6, has three light sources. The lamp unit 1210 makes usage not only of a first printed circuit board 1222 and a first LED 1223 for coupling light into a first conductor 1224 and a light foil 1235, but in addition uses a second printed circuit board 1212 and a second LED 1213 for coupling light into a second conductor 1214. The light foil 1235 extends along a lens 1336 and overlaps both of the other two light sources 1212, 1213 and 1222, 1223 as well as their respective light conductors 1214, 1224. The lens 1336 is coated with the translucent chromium-based coat, but does not have to be coated.

Figure 10:
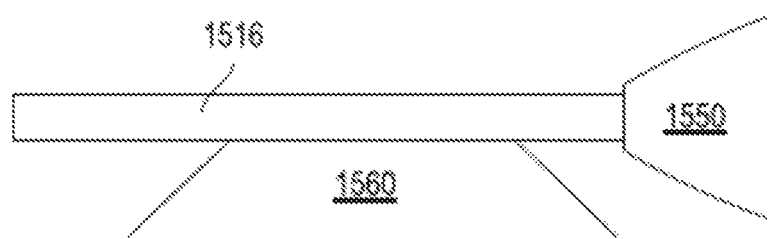
Figure 11:
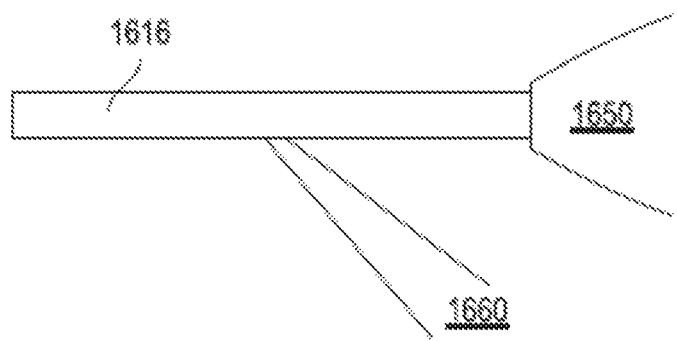

Thus, in addition to the first light source 1222, 1223 and the second light source 1235, the lamp unit 1250 includes the third light source 1212, 1213. FIG. 10 and FIG. 11 illustrate light cones decoupled from the first and third light sources 1222, 1223 and 1212, 1213.

Referring to FIG. 10, a multifunction lamp unit 1516 emits light rays along its lens in analogy to the lamp unit 1416 of FIG. 9. The respective light rays are not shown in FIG. 10. FIG. 10 rather serves to explains light decoupled from two light conductors as the two light conductors 1214 and 1224 of FIG. 7. In fact, the first light conductor 1224 guides all light to one end of the lamp unit 1516 such that there is a light cone 1550, whereas the second light conductor 1214 decouples light along its extension such that there is a light cone 1560 as shown in FIG. 10.

Referring to FIG. 10, each of the light cones 1550 and 1560 as well as the light rays emitted from the light foil can fulfill different functions. For example, the light cone 1550 could be used as a turn signal, whereas the light cone 1560 could be used as an approach light and the light rays emitted from the light foil could have decorative purposes.

Figure 12:
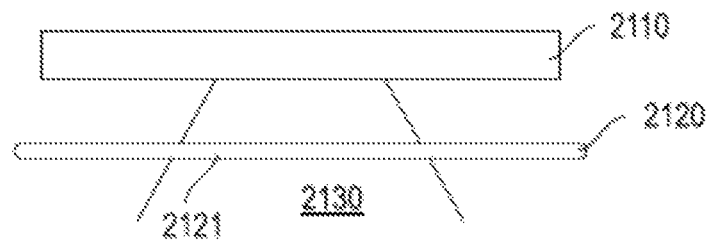
Figure 13:
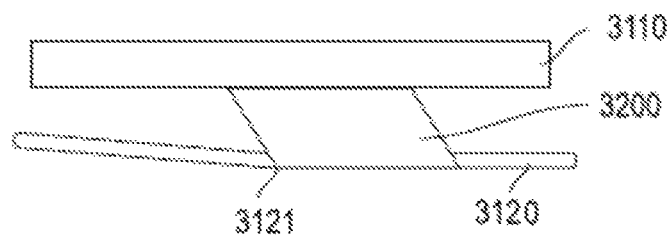

Further possibilities of light emissions from multifunctional lamp units of the invention are shown in FIGS. 11 to 13. Those examples are not restricted to the ones illustrated. There are many more possibilities which lie within the knowledge of a person having ordinary skill in the art.

In the embodiment shown in FIG. 11, which is providing a slight alternative to the one of FIG. 10, a lamp unit 1616 is provided with two light sources each including a printed circuit board and an LED as well as a light guide such that the light cones 1650, 1660 can be decoupled into selected directions. The directions of the light cones 1650, 1660 depend on the functions to be fulfilled. In addition a light foil can be used to emit light ray homogeneously along the lens, although not shown.

FIG. 12 shows a lamp unit 2110 which is installed within a rear view device, e.g. an exterior mirror. A casing part 2120 of the rear view device is shown to overlap one side of the lamp unit 2110, which can be the underside. The casing part 2120 is provided with a transparent region 2121 through which a light cone 2130 can be emitted on the ground in order to provide a puddle light function. The light cone 2130 could come from a specially oriented third light source and/or light conductor.

The embodiment of FIG. 13 shows another lamp unit 3110 arranged within a rear view device, e.g. a camera port, having a casing part 3120 with an opening 3121. A light conductor 3200 is extending from the lamp unit 3110 towards the opening 3121 within the casing part 3120 such that light can be guided into a specific direction to fulfill a specific function which could be the function of a logo lamp.

In an example, the rearview device may also be equipped with different illumination devices. Different functions and devices may be incorporated into and/or controlled with the help of rearview devices including cameras.

Functions and devices to enhance, extend and/or sustain the functionality of the rearview device during normal or extreme conditions are useful. This may include heating and/or cooling means, cleaning means such as wipers, liquid and/or gaseous sprays, actuator means for moving the rearview device or parts of it, such as a display, a camera system and/or parts of a camera system, including lenses, filters, light sources, adaptive optics like deformable mirrors, sensors and/or mirrors, actuator means for inducing movement of other objects such as parts of the vehicle and/or objects surrounding the vehicle, and/or other optical elements. Furthermore, it may include linear tracks and/or rotating wheels such as for example a filter wheel, for exchanging optical elements, including lenses, mirrors, light sources, sensors, adaptive optics like deformable mirrors, filters, and/or other optical elements.

Some examples for functions and devices incorporated into and/or controlled with the help of rearview devices include illumination devices such as any kind of light module like an external light module, an internal light module, a front light, a back light, a fog light, a brake light, an acceleration light, a turn signal, a logo lamp, a puddle light, a flash light, a navigation light, a position light, an emergency light, a spotlight, a green light, a red light, a warning light, a turn signal light module, an approach light, a search light, an information light, a display and/or any combination thereof.

Figure 14:
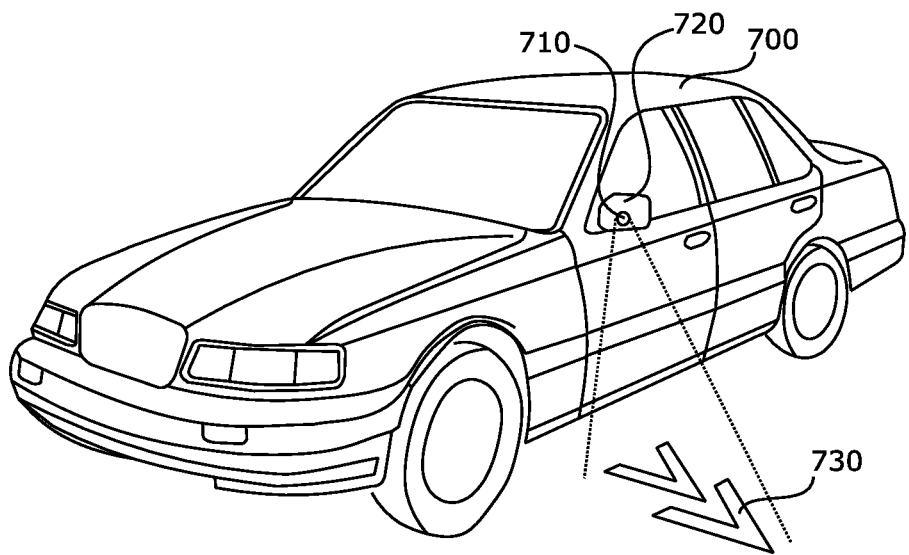
FIG. 14 is a diagram illustrating a vehicle with a multifunction lamp including a projecting unit acting as an additional side turn indicator.
Figure 15:
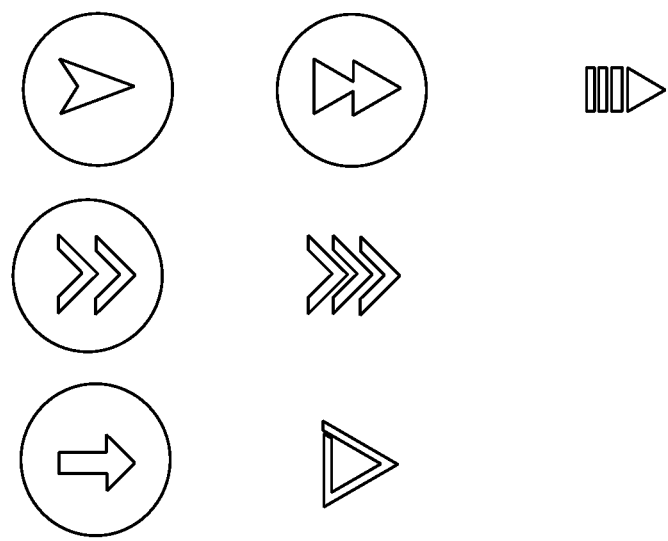
FIG. 15 is a diagram illustrating various symbols which can be projected by the projecting unit of the vehicle of FIG. 14.

As shown in FIG. 14, a projection unit 710 can be incorporated into a rear view device 720 of a vehicle 700 to provide the ability to project symbols 730 onto a road surface. In the example shown, the projection unit 710 acts as an additional side turn indicator and projects the symbol 730 when a side turn indicator switch of the vehicle 700 is actuated by a driver of the vehicle. Further examples of symbols 730 for indicating an impending side turn are summarized in reference to FIG. 15. While this particular embodiment of the invention is discussed in the context of a multifunction lamp unit having a projection unit 710, all of the following holds true for any form of multifunction lamp unit discussed above.

Figure 16:
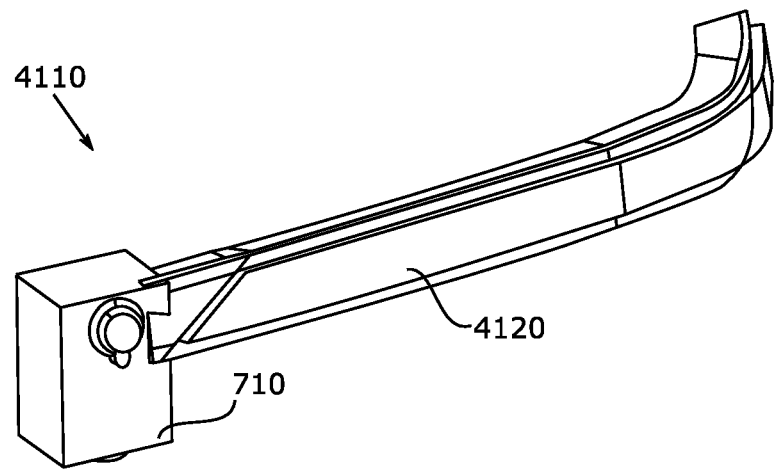
FIG. 16 is a diagram illustrating a perspective view of a first multifunction side turn indicator lamp with an integrated projecting unit and an integrated turn signal indicator light.

FIG. 16 shows a first possibility for the integration of the projection unit 710 into a multifunction lamp unit 4110. In this example, the projection unit 710 is formed integrally with a turn signal indicator light 4120 of the lamp unit 4110. The turn signal indicator light 4120 may be formed like the lamp 10, 100 or 1110 described above.

Figure 17:
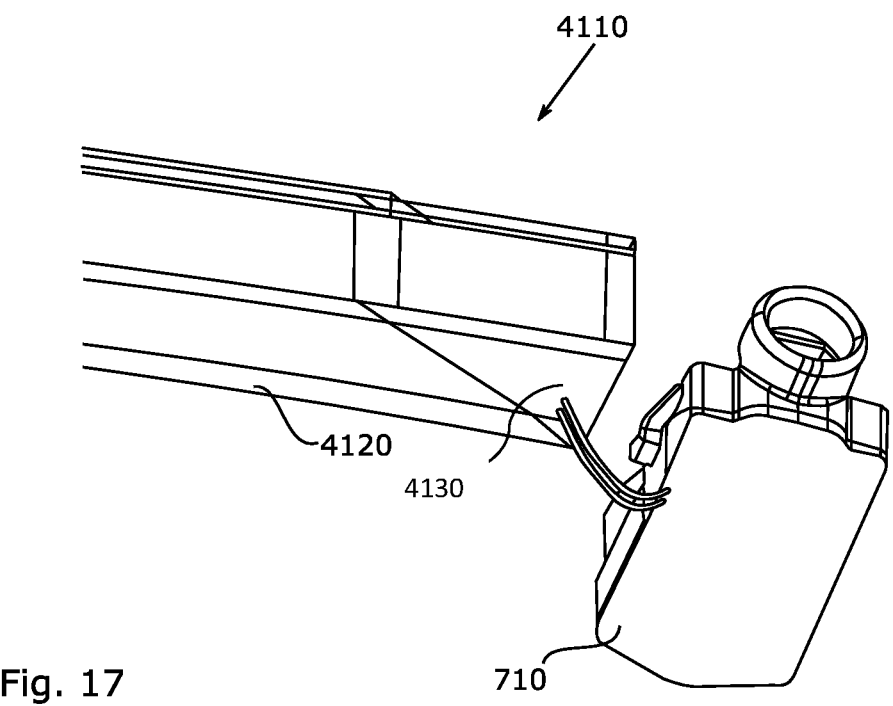
FIG. 17 is a diagram illustrating a perspective view of a second multifunction side turn indicator lamp with an integrated projecting unit and a separate turn signal indicator light the invention.

As shown in FIG. 17, the turn signal indicator light 4120 may also be connected via wires 4130 to the projection unit 710.

Various possibilities for arranging the projection unit 710 within the rear view device 720 are illustrated in FIGS. 18 to 21.

Figure 18:
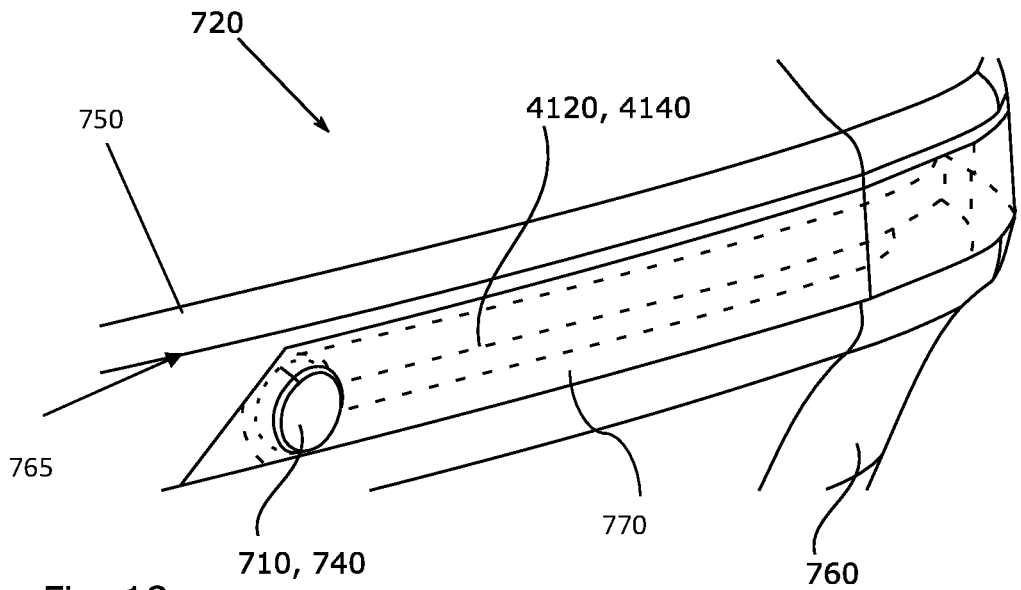
FIG. 18 is a diagram illustrating a first embodiment of a rear view device with the multifunction lamp of FIG. 16.

For example, as illustrated in the example of FIG. 16, a clear window 740 for the projection unit 710 is provided by a cover 4140 of the turn signal indicator light 4120 according to FIG. 18. The clear window 740 is arranged to cover an opening 765 between a scalp portion 750 and a lower casing portion 770 of a casing 760 of the rear view device 720.

Figure 19:
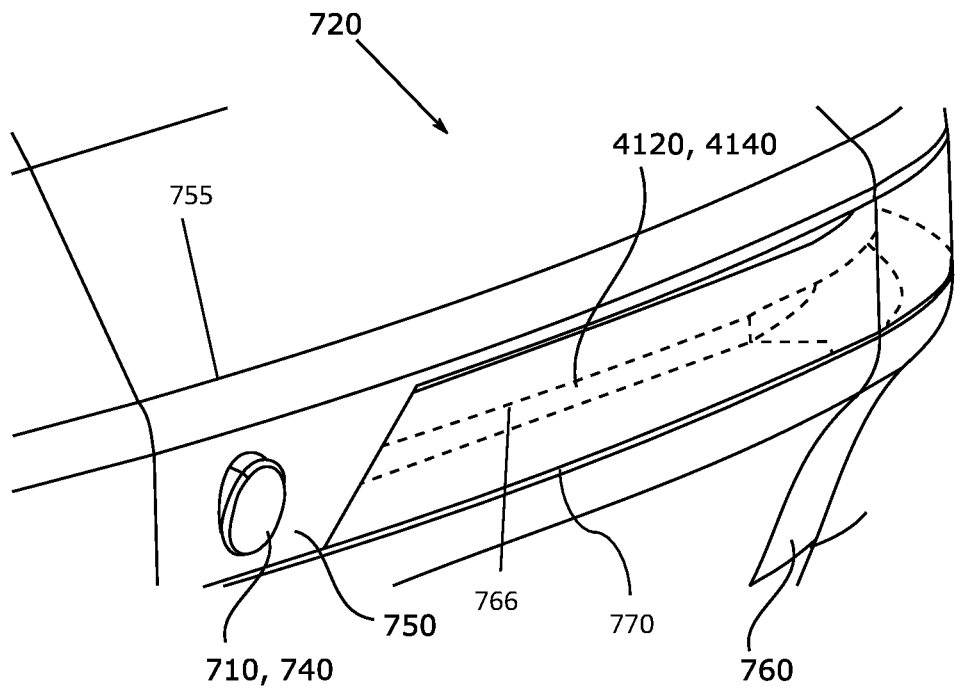
FIG. 19 is a diagram illustrating a second embodiment of a rear view device with the multifunction lamp of FIG. 16.

In another example, as depicted in FIG. 19, the cover 4140 of the turn signal indicator light 4120 can be arranged to cover an alternative opening 766 between the scalp portion 750 and the lower casing portion 770 of the rear view device 720, with the scalp portion 750 being provided with an additional opening 755 through which the window 740 of the projection unit 710 extends.

Figure 20:
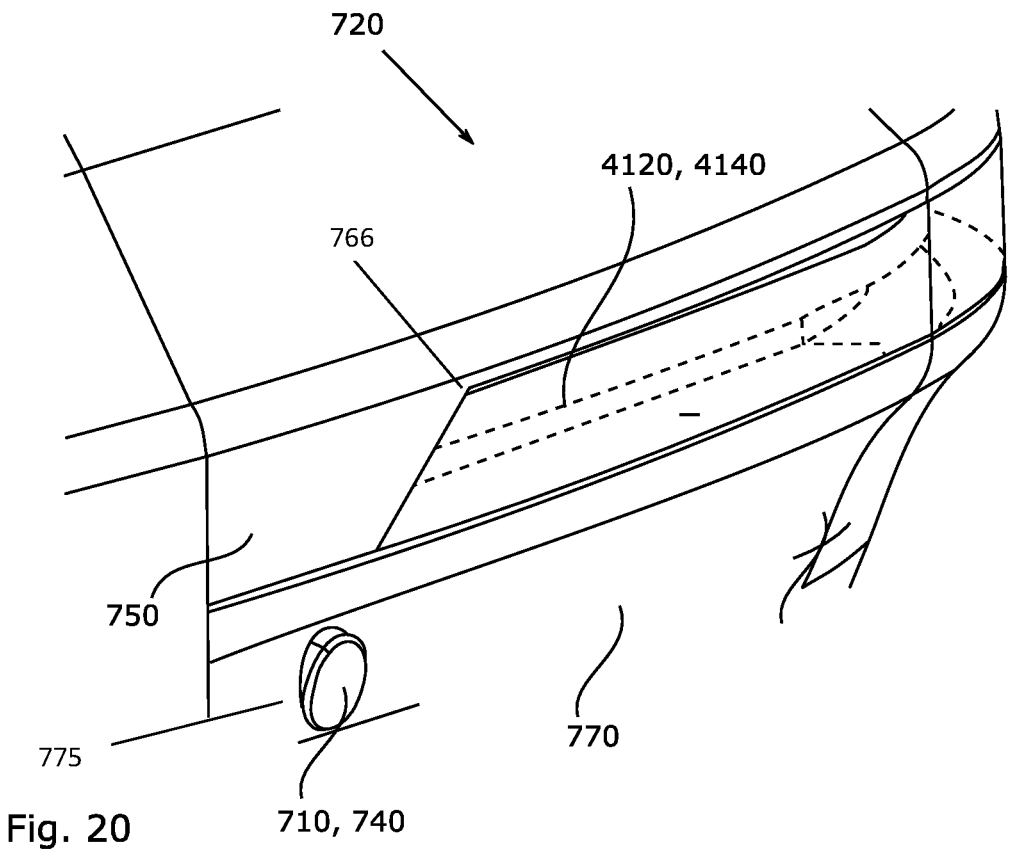
FIG. 20 is a diagram illustrating a third embodiment of a rear view device with the multifunction lamp of FIG. 17.

In a further example, as illustrated in FIG. 20 and referring back to FIG. 17 with the turn signal indicator light 4120 being connected via wires 4130 to the projection unit 710, the window 740 can be placed within an opening 775 of the lower casing portion 770, also known as the "sword" of the rear view device 720.

In all three examples mentioned above, the window 740 and/or cover 4140 may be formed integrally with the respective surrounding part, i.e. the scalp portion 750 or the lower casing portion 770 of the casing 760, by means of 2-component injection molding. This allows for a particularly fast and easy production of the respective part of the rear view device 720. Nevertheless, they are not limited to being formed as such.

The window 740 and/or cover 4140 may be formed out of transparent, clear or tinted PC or PMMA, while the remainder of the respective part is formed from HDPE, PP or ABS. This yields a scratch-resistant and UV-resistant window 740 and/or cover 4140, which preserves its optical quality. Thus, the display quality for the multi-function lamp unit is preserved, and a mechanically stable and warp-resistant housing part 750, 770, 4140 is provided.

The order of the 2-component injection process can be adapted to any particular case, i.e. it is possible to first inject the polymer for the window 740, followed by the polymer for the surrounding part 750, 770, 4140 or vice versa.

Figure 21:
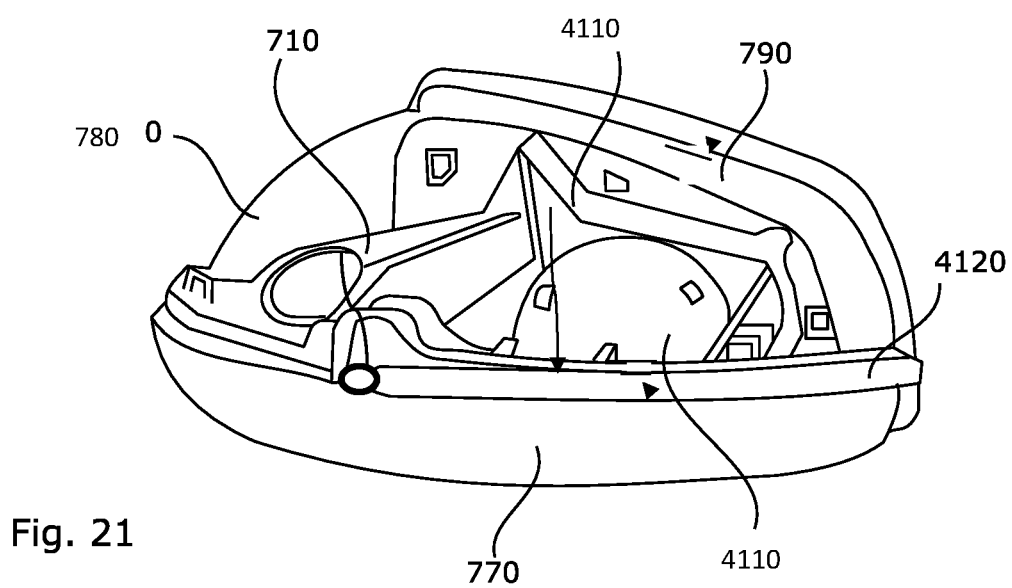
FIG. 21 is a diagram illustrating a forth embodiment of a rear view device according to the invention with the multifunction lamp of FIG. 16.

FIG. 21 shows a partially opened rear view device 720 after removal of the scalp portion 750, and with the multi-function lamp of FIG. 18, an upper casing portion 780, and a bezel 790.

In modern vehicles 700, rear view devices 720 are often foldable, i.e. they can be moved from their operational position as shown in FIG. 14 to a folded position, in which they are arranged flatly against the side of the vehicle 700. The folded position is used for example when the vehicle 700 is parked, in order to save lateral space. The folding and unfolding movement of the rear view device 720 is usually actuated by at least one electrical motor, a shaped memory alloy actuator or the like.

If the projection unit 710 is incorporated into such a foldable rear view device 720, the projection function can be changed depending on the respective position of the rear view device 720. For example, the projection unit 710 can project a turn indicator symbol 730 when the rear view device 720 is in its operational position, as shown in FIG. 14.

When the rear view device 720 is moved into its folded position (not shown), the projection can be changed to emit, for example, a manufacturer's logo or the like. It is further possible to change the color of the projection in this case too. For example, the turn indicator symbol 730 is preferably shown in yellow or amber, to stay in line with the usual color coding of side turn indicator lights. To distinguish the functional and decorative projections, the logo can then be shown in a different color, for example white or blue, which is usually not associated with traffic-related signals.

When the projection unit 710 is incorporated into a multifunction lamp unit 4110, as shown in example of FIG. 16, further functions of the lamp unit 4110 can be changed when the rear view device 720 is folded or unfolded. For example, a turn signal indicator light may still be activated when the rear view device 720 is in its folded state. Additionally, a puddle light or logo light of the lamp unit 4110 can be activated when the rear view device 720 is transitioning into its folded state or upon reaching the folded state, this provides assistance for a driver of the vehicle 700 when entering or exiting the vehicle 700. The function of the projection unit 710 can also be modified depending on the activity of other functions of the lamp unit 4110. For example, the projection unit 710 may be deactivated when a hazard light is activated in order to minimize distractions to other traffic participants in hazardous situations.

In order to provide the above mentioned functions, the folding mechanism of the rear view device 720 and the lamp unit 4110 can be connected to a control unit (not shown). The control unit may issue instructions to the various components of the multifunction lamp unit 4110 including the projection unit 710. The control unit may also receive information about the position of the rear view device 720, either directly from an actuator unit of the folding mechanism or from other control units in the vehicle 700. This can be achieved, for example, via a bus connection like a CAN-bus, a LIN-bus or the like.

Further examples for functions and devices incorporated into and/or controlled with the help of rearview devices may include for example a tiredness detection system, a microsleep detection system, a distance and/or velocity determination system, such as a LIDAR (Light detection and ranging) system, a blind spot indicator system, a lane change assistant system, a navigation assistant system, a tracking assistant system, a human-machine interaction system, a machine-machine interaction system, an emergency and precaution assistant system, like an accident avoiding assistant system, a counter-measures assistant system, a brake assistant system, a steering assistant system, an acceleration assistant system, an escape assistant system, including for example an ejection seat system, a direction indicator, a blind spot indicator, an approach system, a strong braking system, an emergency braking system, a charging status indicator, a vehicle mode system, including for example a sports mode system, an economy mode system, an autonomous drive mode system, a sleep mode system and an anti-theft system, a vehicle locked indicator system, a vehicle stolen indicator, a warning signal system, a temperature indicator system, a weather indicator system, a traffic light signal system, a fuel status system and/or any combination thereof.

An example for a rearview device including an illumination device fulfilling the brake light functions is described in German Patent Application No. 102012108488, filed on Sep. 11, 2012 for REARVIEW ASSEMBLY FOR MOTOR VEHICLE, which is hereby incorporated herein by reference in its entirety for all purposes. A light guidance unit for an illumination device used in a back vision system is described in German Patent Application No. 102012104529, filed on May 25, 2012 for LIGHT GUIDANCE UNIT, which is hereby incorporated herein by reference in its entirety for all purposes. An illumination device for a rearview device is described in German Patent Application No. 102012107833, filed on Aug. 24, 2012 for ILLUMINATION DEVICE AND REARVIEW DEVICE which is hereby incorporated herein by reference in its entirety for all purposes. A lighting device for a back-vision unit is described in German Patent Application No. 102012107834, filed on Aug. 24, 2012 for LIGHTING DEVICE AND BACK-VISION UNIT, which is hereby incorporated herein by reference in its entirety for all purposes. A housing and display device of a rearview device is disclosed in European Patent No. 2738043, filed on Dec. 3, 2012 for HOUSING AND DISPLAY DEVICE, which is hereby incorporated herein by reference in its entirety for all purposes. An optical light guide for a vehicle lighting unit is described in European Patent No. 2947378, filed on May 22, 2014 for OPTICAL LIGHT GUIDE FOR A VEHICLE LIGHTING UNIT, which is hereby incorporated herein by reference in its entirety for all purposes. A display device of a rearview device of a vehicle is disclosed in International Patent Application Publication No. WO 2015/173695, filed on May 7, 2015 for DISPLAY DEVICE, REAR VIEW DEVICE AND MOTOR VEHICLE and claiming priority to European Patent Application No. 2944866, filed on May 12, 2014 for OPTICAL UNIT, DISPLAY DEVICE, REAR VIEW DEVICE AND MOTOR VEHICLE INCLUDING THE SAME, each of which is hereby incorporated herein by reference in its entirety for all purposes. Further a light guiding device for an illumination device, in particular for a motor vehicle or a display device, in a rearview device of a motor vehicle is disclosed in European Patent Application No. 3045944, filed on Jan. 19, 2015 for LIGHT GUIDING DEVICE, which is hereby incorporated herein by reference in its entirety for all purposes. Still further a light guiding device for an illumination device, especially for a motor vehicle or an indicator device in a rearview device of a motor vehicle is disclosed in U.S. patent application Ser. No. 15/228,566, filed on Aug. 4, 2016, for LIGHT GUIDING DEVICE and is a continuation-in-part of U.S. patent application Ser. No. 15/000,733, filed on Jan. 19, 2016 for LIGHT GUIDING DEVICE, each of which is hereby incorporated herein by reference in its entirety for all purposes. In addition, an illumination device, particularly for a rear-view device of a motor vehicle and a method for producing the same are described in International Patent Application Publication No. WO 2016/147154, filed on Mar. 18, 2016 for ILLUMINATION DEVICE AND METHOD FOR PRODUCING AN ILLUMINATION DEVICE and claiming priority to German Patent Application No. 102015104163, filed on Mar. 19, 2015 for ILLUMINATION DEVICE AND METHOD FOR PRODUCING AN ILLUMINATION DEVICE, each of which is hereby incorporated herein by reference in its entirety for all purposes. An improved rear-view device for a motor vehicle which includes an electronic device is described in U.S. patent application Ser. No. 15/256,532, filed on Sep. 3, 2016 for ELECTRONIC DEVICE AND REAR-VIEW DEVICE and claiming priority to European patent application No. 3139711, filed on Sep. 3, 2015 for ELECTRONIC DEVICE AND REAR VIEW DEVICE, each of which is hereby incorporated herein by reference in its entirety for all purposes. A lighting device for a rearview device or a footwell device of a vehicle, including at least one luminous means is described in German Patent Application No. 102015115555, filed on Sep. 9, 2015 for ILLUMINATION DEVICE, REAR VIEW DEVICE, FOOTWELL DEVICE AND VEHICLE, which is hereby incorporated herein by reference for all purposes. A light module for a light assembly of an exterior rear view device is described in European Patent Application No. 3138734, filed on Sep. 3, 2015 for LIGHT MODULE, LIGHT ASSEMBLY AND REAR VIEW DEVICE FOR A VEHICLE, which is hereby incorporated herein by reference in its entirety for all purposes. A lighting device for a vehicle component, in particular for a rearview device of a motor vehicle, including a logo lamp and a deflection mirror are described in European Patent Application No. 3144183, filed on Sep. 13, 2016 for LIGHTING DEVICE, VEHICLE COMPONENT AND VEHICLE and claiming priority to German Utility Patent Application No. 202015104894, filed on Sep. 15, 2015 for LIGHTING DEVICE, VEHICLE COMPONENT AND VEHICLE, each of which is hereby incorporated herein by reference in its entirety for all purposes.

A camera module may include a plurality of different optical elements, such as but not limited to a variety of sensors, light sources, and housing parts.

The housing of a camera module may be made out of plastic, metal, glass, any other suitable material and/or any combinations thereof and may be used in combination with the techniques described below to change or modify the properties of the material or the material surface. Housings are, for example, described in German Patent Application No. 102016108247.3, filed on May 3, 2016 for CLEANING SYSTEM FOR A CAMERA and U.S. patent application Ser. No. 15/281,780, filed on Sep. 30, 2016 for TELESCOPING REARVIEW ASSEMBLY WITH CAMERA AND LENS WIPING SYSTEM, each of which is hereby incorporated herein by reference in its entirety for all purposes.

The camera may include for example CCD or CMOS or light field sensors, as for example described in German Patent Application No. 102011053999, filed Sep. 28, 2011 for DETECTION SYSTEM FOR OPTICAL DETECTION OF OBJECT AND/OR REGION OF SPACE FOR DRIVER ASSISTANCE AND/OR DISPLAY SYSTEMS OF MOTOR VEHICLE, HAS OPTICAL SENSOR ARRANGED AS LIGHT FIELD SENSOR FOR DETECTION and U.S. patent application Ser. No. 09/771,140, filed on Jan. 26, 2001 for MONITORING DEVICE FOR VEHICLES, IN PARTICULAR, MOTOR VEHICLES, now U.S. Pat. No. 6,703,925, each of which is hereby incorporated herein by reference in its entirety for all purposes. Also an area of the sensor can be reserved for different purposes, for example to detect a test beam, as described in U.S. Pat. No. 8,031,224, filed on Sep. 9, 2014 for CAMERA SYSTEM, METHOD FOR OPERATION OF A CAMERA SYSTEM AND SENSOR DEVICE OF A CAMERA SYSTEM, which is hereby incorporated herein by reference in its entirety for all purposes.

The optical elements may be molded or formed from any type of glass or any other suitable material. Glass is herein defined as a non-crystalline amorphous solid showing a glass transition when heated towards the liquid state. It includes, for example, the group of polymeric glasses, metallic glasses, silica glasses, but any other suitable material showing the glass transition may be used. The glass may be in a flat, wedge, rectangular, cylindrical, spherical, conical, elliptical, and/or circular shape, as described for example in German Patent Application No. 102016108247.3, and German Patent Application No. 102011103200, filed on May 31, 2011 for LIGHT WINDOW FOR USE AS LIGHT CONDUCTOR FOR TURN INDICATOR IN OUTSIDE MIRROR ARRANGEMENT OF VEHICLE, HAS UNCOUPLING STRUCTURES AT CERTAIN LOCATION OF WINDOW, AND OPTICAL FILM WITH MOLDED COATING AND PROVIDED WITH UNCOUPLING STRUCTURES, each of which is hereby incorporated herein by reference in its entirety for all purposes. The glass may also have a shape according to different needs or lens types. As non-limiting examples, camera modules may be equipped with lenses, like a wide-angle or fish-eye lens suitable to provide peripheral images, as described in U.S. patent application Ser. No. 15/281,780, and U.S. patent application Ser. No. 13/090,127, filed on Apr. 19, 2011 for REAR VIEW MIRROR SIMULATION, now U.S. Pat. No. 9,238,434, a Fresnel lens or micro lenses as described in German Patent Application No. 102011053999, filed on Sep. 28, 2011 for DETECTION SYSTEM FOR OPTICAL DETECTION OF OBJECT AND/OR REGION OF SPACE FOR DRIVER ASSISTANCE AND/OR DISPLAY SYSTEMS OF MOTOR VEHICLE, HAS OPTICAL SENSOR ARRANGED AS LIGHT FIELD SENSOR FOR DETECTION, and a TIR (total internal reflection) lens as described in U.S. Pat. No. 8,740,427, filed on Sep. 8, 2010 for OPTIMAL LIGHT COUPLING FOR REAR VIEW DEVICES, each of which is hereby incorporated herein by reference in its entirety for all purposes. Another type of optical element know to be used in camera modules are optical fibers, such as fiber bundles and preferably fiber bundles having an optical head, as described for example in U.S. patent application Ser. No. 09/771,140, filed on Jan. 26, 2001 for MONITORING DEVICE FOR VEHICLES, IN PARTICULAR, MOTOR VEHICLES, now U.S. Pat. No. 6,703,925, which is hereby incorporated by reference herein in its entirety for all purposes. Different methods can be used to produce such optical elements, for example as described in U.S. Pat. No. 8,460,060, filed on Jan. 30, 2009 for METHOD FOR CREATING A COMPLEX SURFACE ON A SUBSTRATE OF GLASS, which is hereby incorporated herein by reference herein in its entirety for all purposes.

The optical elements can be transparent as described for example in U.S. Pat. No. 8,031,224, German Patent Application No. 102016108247.3, and U.S. patent application Ser. No. 13/242,829, filed on Sep. 23, 2011 and published as U.S. Patent Application Publication No. 2012/0154587 for CAMERA ARRANGEMENT AND DOOR HANDLE FOR MOTOR VEHICLE, each of which is hereby incorporated herein by reference in its entirety for all purposes. But the optical elements can also be semitransparent, as described in U.S. patent application Ser. No. 09/771,140 and U.S. patent application Ser. No. 13/090,127, each of which is hereby incorporated herein by reference in its entirety for all purposes. Still further, the optical elements can be completely or partially coated with different types of coatings to realize different effects, such as for example anti-reflective coatings as described in U.S. Pat. No. 8,031,224, chromium-based reflective coatings as described in U.S. Pat. No. 9,181,616, filed on Jan. 24, 2012 for CHROMIUM-BASED REFLECTIVE COATING, and other coatings, for example for polymeric substrates as described in U.S. patent application Ser. No. 14/936,024, filed on Nov. 9, 2015 for COATED POLYMERIC SUBSTRATES and in U.S. patent application Ser. No. 15/124,310, filed on Feb. 20, 2015 and published as U.S. Patent Application Publication No. 2017/0015802 for DECORATIVE COATINGS FOR PLASTIC SUBSTRATES, each of which is hereby incorporated herein by reference in its entirety for all purposes. Preferably the optical elements are made of a scratch-proof material as described for example in German Patent Application No. 102016108247.3, which is hereby incorporated herein by reference in its entirety for all purposes. The optical elements can have uncoupling structures at certain locations of the optical elements, and an optical film, for example an extrusion film, and a molded coating can be applied as described in German Patent Application No. 102011103200, which is hereby incorporated herein by reference in its entirety for all purposes. A coating to spectrally and stress control is described in U.S. patent application Ser. No. 15/124,310, which is hereby incorporated herein by reference in its entirety for all purposes. Different filters can be integrated into the optical elements such as for example gray filters or polarization filters, described in U.S. patent application Ser. No. 14/809,509, filed on Jul. 27, 2015 and published as U.S. Patent Application Publication No. 2016/0096487, for APPARATUS FOR LIGHT INTENSITY ADJUSTMENT, which is hereby incorporated herein by reference in its entirety for all purposes.

Electrochromic substrates, polymer electrolytes and other charge conducting medias may be used for the optical elements based on the descriptions of European Patent Application No. 08103179.1, filed on Mar. 31, 2008 for PROCESS FOR PRODUCING ELECTROCHROMIC SUBSTRATES AND ELECTROCHROMIC ARTICLES MADE THEREFROM, European Patent No. 2202826, filed on Dec. 23, 2008 for POLYMER ELECTROLYTES AND DEVICES CONTAINING, U.S. Pat. No. 7,999,992, filed on Jan. 7, 2005 for CHARGE CONDUCTING MEDIUM_and U.S. Pat. No. 8,537,451, filed on Mar. 26, 2008 for PROCESSES FOR PRODUCING ELECTROCHROMIC SUBSTRATES AND ELECTROCHROMIC ARTICLES MADE THEREFROM, each of which is hereby incorporated herein by reference in its entirety for all purposes.

The camera module can also be equipped with apparatuses for light intensity adjustment as described for example in U.S. patent application Ser. No. 14/809,509 and light level intensifier tubes as described in U.S. patent application Ser. No. 09/771,140, each of which is hereby incorporated herein by reference in its entirety for all purposes. The electrochromic substrates and devices used in European Patent Application No. 08103179.1, European Patent No. 2202826, U.S. Pat. Nos. 7,999,992, and 8,537,451, each of which is hereby incorporated herein by reference in its entirety for all purposes, can also be used for this purpose as well as a transflector to transmit or reflect light based on a corresponding input signal, as described in German Patent Application No. 102016106126.3, filed on Apr. 4, 2016 for IMAGING SYSTEM, which is hereby incorporated herein by reference in its entirety for all purposes.

The camera module or a cover adapted to the camera module can be moved using different actuators, drives and/or a flexible track, as for example described in German Patent Application No. 102016108247.3 and U.S. patent application Ser. No. 15/281,780, filed on Sep. 30, 2016 for TELESCOPING REARVIEW ASSEMBLY WITH CAMERA AND LENS WIPING SYSTEM, each of which is hereby incorporated herein by reference in its entirety for all purposes.

Still further, the camera module can also include cleaning elements to clean the optical element facing outwards and being exposed to the environment. The cleaning element can for example include wipers, brushes, lips, nozzles, fans and similar elements as are described in European Patent Application No. 14165197.6, filed on Apr. 17, 2014 for OPTICAL SYSTEM FOR A VEHICLE, CLEANING DEVICE AND VEHICLE COMPRISING AN OPTICAL SYSTEM, U.S. patent application Ser. No. 15/281,780, filed on Sep. 30, 2016 for TELESCOPING REARVIEW ASSEMBLY WITH CAMERA AND LENS WIPING SYSTEM, German Patent Application No. 102016108247.3, European Patent Application No. 13163677.1, filed on Apr. 15, 2013 for LENS WIPER, European Patent Application No. 15173201.3, filed on Jun. 22, 2015 for LENS CLEANING WITH FLEXIBLE ACTUATOR and European Patent No. 1673260, filed on Oct. 14, 2003 for CLEANING DEVICE, each of which is hereby incorporated herein by reference in its entirety for all purposes. The cleaning devices are not limited in composition, and may for example include any fabric, elastomeric, sponge, brush, or combination of these. Special wiper elements including wiper arms, wiper blades, wiping cloth, wiping tissue and combinations thereof are described in European Patent Application No. 14165197.6, which is hereby incorporated herein by reference in its entirety for all purposes. A wiper element may for example be controlled according to the method described in European Patent Application No. 130164250.6, filed on Apr. 18, 2013 for METHOD FOR CONTROLLING A WIPER DEVICE, which is hereby incorporated herein by reference in its entirety for all purposes. A reservoir for holding a cleaning liquid as described in European Patent Application No. 14165197.6, which is hereby incorporated herein by reference in its entirety for all purposes. Such a reservoir can be attached to or integrated into the camera module to provide the cleaning liquid to the optical elements of the camera module.

Different methods may be used to detect dirt or other obscurations preventing or reducing the functioning of the camera module, such as described in U.S. Pat. No. 8,395,514, filed on Jun. 24, 2008 for OPTICAL SYSTEM AND METHOD FOR DETECTING OPTICAL SYSTEM OBSCURATION IN A VEHICLE, European Patent No. 1328141, filed on January 12, for ASSEMBLY HAVING A CONDUCTOR FROM FLEXIBLE MATERIAL AND METHOD FOR MANUFACTURING SUCH AN ASSEMBLY, and U.S. Pat. No. 8,031,224, filed on Sep. 9, 2014 for CAMERA SYSTEM, METHOD FOR OPERATION OF A CAMERA SYSTEM AND SENSOR DEVICE OF A CAMERA SYSTEM, each of which is hereby incorporated herein by reference in its entirety for all purposes.

Also, light sources can be installed or integrated into the camera module to increase the visibility of surrounding objects, measure distances and directions and detect dirt, such as described in U.S. Pat. No. 8,031,224, filed on Sep. 9, 2014 for CAMERA SYSTEM, METHOD FOR OPERATION OF A CAMERA SYSTEM AND SENSOR DEVICE OF A CAMERA SYSTEM, U.S. Patent Application No. 62/470,658, filed on Mar. 13, 2017, 2016 for LIGHT EMITTING MIRROR BEZEL and U.S. patent application Ser. No. 09/771,140, filed on Jan. 26, 2001 for MONITORING DEVICE FOR VEHICLES, IN PARTICULAR, MOTOR VEHICLES, each of which is hereby incorporated herein by reference in its entirety for all purposes.

Different heating means, like heating coils, heating devices integrated into the lens holder or the bezel, or other heating elements can be used to impede condensation and icing at the surface of optical elements, as for example described in German Patent Application No. 102016108247.3, U.S. Patent Application No. 62/470,658, and German Patent Application No. 102016107545.0, filed on Apr. 22, 2016 for HEATING DEVICE FOR A CAMERA LENS, each of which is hereby incorporated herein by reference in its entirety for all purposes.

A watertight seal against weather effects, as well as against the influence of washing processes with detergents, solvents and high pressure cleaners can be used on the housing of the camera module as described in U.S. patent application Ser. No. 13/090,127, which is hereby incorporated herein by reference in its entirety for all purposes.

In another example, the housing can be made of a body including plastic and conductive material, wherein the conductive material is dispersed in the plastic material to form a conductive mass to allow a power source, preferably a DC voltage source, to connect via at least two electrodes to the body and heat the body accordingly, as described in German Patent Application No. 102016107545.0, which is hereby incorporated herein by reference in its entirety for all purposes.

A conductor track can be embedded within plastic parts of the camera module as described in European Patent No. 1328141 and U.S. Pat. No. 7,083,311, filed on Jan. 12, 2002 for CONDUCTOR OF FLEXIBLE MATERIAL, COMPONENT COMPRISING SUCH FLEXIBLE CONDUCTOR, AND METHOD OF MANUFACTURING SUCH CONDUCTOR, each of which is hereby incorporated herein by reference in its entirety for all purposes.

The camera module may include a power harvesting system as described for example in European Patent Application No. 09171683.7, filed on Sep. 29, 2009 for SELF SUSTAINING REAR VIEW MIRROR, which is hereby incorporated herein by reference in its entirety for all purposes.

A fault detection system for electric consumers as described in U.S. Pat. No. 8,487,633, filed on Jan. 14, 2010 for FAULT DETECTION OF ELECTRIC CONSUMERS IN MOTOR VEHICLES, which is hereby incorporated herein by reference in its entirety for all purposes, can be used to detect failure of the camera module.

Different types of fixings can be used to fix the camera module to the vehicle or other components, such as for example the snap-fit connection described in European Patent No. 2233360, filed on Mar. 27, 2009 for SNAP FIT CONNECTION IN A REAR VIEW MIRROR, which is hereby incorporated herein by reference in its entirety for all purposes.

Different control means and analyzing devices can be used, such as the computation units described in U.S. patent application Ser. No. 13/090,127, German Patent Application No. 102016106126.3, German Patent Application No. 102011053999, European Patent No. 2146325, filed on July 16, for RECORDING DEVICE FOR RECEIVING, PROCESSING AND STORING IMAGE FILES IN A VEHICLE AND METHOD, and U.S. Pat. No. 8,849,104, filed on Jul. 16, 2008 for RECORDING DEVICE AND METHOD FOR CAPTURING AND PROCESSING IMAGE DATA IN A VEHICLE, each of which is hereby incorporated herein by reference in its entirety for all purposes. In addition, HDR (high dynamical range) technology can be used according to U.S. patent application Ser. No. 14/830,406, filed on Aug. 19, 2015 for REAR VIEW DEVICE FOR A MOTOR and published as US 2015/0358590, which is hereby incorporated herein by reference in its entirety for all purposes.

There are many more variations of the amount of light sources, the type of light sources and the relative arrangement of the light sources within a multifunctional lamp unit of the invention. The invention is restricted neither to special rear view devices nor to special arrangements of a lamp unit with such a device.

The features of the invention disclosed in the above description, in the claims and in the figures can be essential for realizing the invention in its various embodiments both individually and in any desired combination.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

REFERENCE SIGNS 10 lamp
20 housing
22 back panel
24 web
26 web
28 recess
30 installation space
32 lid
40 light conductor
42 incoupling area
44 lens system
46 total reflection area
48 outcoupling area
60 clear lens
62 lens system
100 lamp
200 housing
280 recess
300 installation space
400 light conductor
420 incoupling area
460 total reflection area
480 outcoupling area
600 clear lens
700 vehicle
710 projection unit
720 rear view device
730 symbol
740 window
750 scalp portion
755 opening
760 casing
765 opening
766 opening
770 lower casing portion
775 opening
780 upper casing portion
790 bezel
1110 lamp unit
1111 housing
1112 printed circuit board
1113 LED
1114 light conductor
1115 light foil
1116 light window
1117 control unit
1120 casing part
1210 lamp unit
1211 housing
1212 printed circuit board
1213 LED
1214 light conductor
1222 printed circuit board
1223 LED
1224 light conductor 1235 light foil
1236 light window
1247 control unit
1250 casing part
1336 lens
1340 coating
1416 lamp unit
1440 light ray
1450 light cone
1516 lamp unit
1550 light cone
1560 light cone
1616 light unit
1650 light cone
1660 light cone
2110 lamp unit
2120 casing part
2121 transparent region
2130 light cone
3110 lamp unit
3120 casing part
3121 opening
3200 light conductor
4110 lamp unit
4120 turn signal indicator light
4130 wire
4140 cover
11111 recess
11112 recess

What is claimed is:

1. A rear view device for a vehicle, comprising:
a multifunctional lamp unit, comprising:
a side turn indicator comprising a housing for at least one light conductor with at least one illuminant;
a projection unit;
at least one clear lens;
wherein the at least one light conductor comprises a first light conductor and a second light conductor,
wherein at least one light coupling area is provided in the location of at least one of a first end of the first light conductor facing an installation space in the housing and a first end of the second light conductor extending along a region of at least one light foil extending along at least a part of the at least one clear lens,
wherein each of the first light conductor and the second light conductor is enclosed by the housing and the at least one clear lens; and
at least one casing part providing at least one opening or at least one window for light emitted by the multifunctional lamp unit.

2. The multifunctional lamp unit of claim 1, wherein the at least one illuminant comprises at least one of an LED on a printed circuit board (PCB), a laser diode, and a light foil.

3. The multifunctional lamp unit of claim 1, further comprising a light source for emitting yellow or amber light which is provided by the at least one illuminant for both the side turn indicator and the projection unit.

4. The multifunctional lamp unit of claim 1, wherein the projection unit comprises either a light source for emitting white light or two light sources, one of the two light sources for emitting yellow or amber light and another one of the two light sources for emitting white light.

5. The multifunctional lamp unit of claim 1, wherein the at least one illuminant comprises one or more light sources combined physically or electrically with the projection unit, or the projection unit comprises one or more light sources combined physically or electrically with the side turn indicator.

6. The multifunctional lamp unit of claim 1,
wherein the side turn indicator, including the at least one clear lens and the at least one light conductor, is produced out of plastic in a 3-component injection procedure, and
wherein a refractive index of the plastic of the at least one clear lens is selected to be different from a refractive index of the plastic of the at least one light conductor, and a boundary defined between the at least one clear lens and the at least one light conductor is at least partly separated by a structure.

7. The multifunctional lamp unit of claim 1, wherein at least one light foil is arranged at least partly between the at least one clear lens and at least a part of the at least one light conductor.

8. The multifunctional lamp unit of claim 6, wherein at least one light conditioning area configured to be used for tinting, dying, reflecting, or scattering is introduced into at least one of the at least one light conductor and the at least one clear lens by choosing at least one additive for the respective plastic.

9. The multifunctional lamp unit of claim 1, wherein the housing is formed with a first recess to build an installation space for the at least one illuminant, and the first recess is sealed.

10. The multifunctional lamp unit of claim 9, wherein the housing is formed with a second recess to build an installation space for a control unit, and the second recess is sealed.

11. The multifunctional lamp unit of claim 10, wherein the control unit is connected to at least one of the at least one illuminant, a light foil and a vehicle.

12. The multifunctional lamp unit of claim 1, wherein at least one light foil extends along at least a part of the at least one clear lens.

13. The multifunctional lamp unit of claim 1, further comprising at least one light decoupling area,
wherein the at least one illuminant comprises a first illuminant, and light rays from the first illuminant are subjected to a total reflection at a boundary defined between the first light conductor and the at least one clear lens outside the at least one light decoupling area.

14. The multifunctional lamp unit of claim 1, wherein the at least one illuminant comprises a first illuminant and a second illuminant, and light rays from the second illuminant are decoupled along at least a part of the extent of the second light conductor.

15. The multifunctional lamp unit of claim 14, wherein the light rays decoupled from the second light conductor pass at least one of the at least one light foil, the at least one clear lens, and the housing.

16. The multifunctional lamp unit of claim 14, wherein the light rays decoupled from the second light conductor pass an opening in at least one of the at least one light foil and the housing.

17. The multifunctional lamp unit of claim 1, wherein the at least one light conductor further comprises a third light conductor and the at least one illuminant comprises a first illuminant, a second illuminant, and a third illuminant, and wherein light rays from the third illuminant are coupled at a first end of the third light conductor and decoupled at a second end of the third light conductor.

18. The multifunctional lamp unit of claim 1, further comprising a plurality of light decoupling regions provided by at least one of the at least one clear lens and the housing.

19. The multifunctional lamp unit of claim 1, wherein the multifunctional lamp unit is configured to provide a plurality of light decoupling directions or light decoupling ranges.

20. The multifunctional lamp unit of claim 1, further comprising a plurality of light decoupling regions, with light having different characteristics being decoupled from the plurality of light decoupling regions.

21. The multifunctional lamp unit of claim 1, wherein the at least one clear lens is made out of a polymeric substrate, wherein the polymeric substrate is coated with a chromium-based reflective coating and wherein the polymeric substrate and the chromium-based reflective coating are at least in part permeable to light originating from at least one of a light foil and the at least one illuminant.

22. The multifunctional lamp unit of claim 21, wherein the chromium-based reflective coating is an alloy of chromium and a dopant material, the dopant material being selected from a group of hexagonally close-packed transition metals, the alloy having a crystal structure of a primary body-centered cubic phase in coexistence with a secondary omega hexagonally close-packed phase.

23. The multifunctional lamp unit of claim 21, wherein the at least one illuminant comprises a first illuminant, a second illuminant, a third illuminant, and a fourth illuminant, and the polymeric substrate comprises a polymeric light pipe into which light from the fourth illuminant is coupled.

24. The multifunctional lamp unit of claim 22, wherein the alloy is a binary alloy of the chromium and the dopant material.

25. The multifunctional lamp unit of claim 24, wherein an atomic percentage of the dopant material in the binary alloy ranges from about 1.9 at. % to about 5.8 at. %.

26. The multifunctional lamp unit of claim 22, wherein the group of hexagonally close-packed transition metals includes at least one of zirconium, titanium, cobalt, hafnium, rubidium, yttrium and osmium.

27. The multifunctional lamp unit of claim 22, wherein the group of hexagonally close-packed transition metals includes at least one of zirconium, titanium and cobalt.

28. The multifunctional lamp unit of claim 22, wherein the alloy is a binary alloy and the dopant material is zirconium, and wherein an atomic percentage of the zirconium in the binary alloy ranges from about 4.5 at. % to about 5.8 at. %.

29. The multifunctional lamp unit of claim 22, wherein the alloy is a binary alloy and the dopant material is titanium, and wherein an atomic percentage of the titanium in the binary alloy ranges from about 1.9 at. % to about 5.8 at. %.

30. The multifunctional lamp unit of claim 22, wherein the alloy is a binary alloy and the dopant material is cobalt, and wherein an atomic percentage of the cobalt in the binary alloy ranges from about 1.9 at. % to 5.7 at. %.

31. The multifunctional lamp unit of claim 22, wherein the chromium-based reflective coating has a thickness of 200 nm, 100 nm, from 40 nm to 80 nm, from 50 nm to 70 nm, or about 60 nm.

32. The multifunctional lamp unit of claim 21, wherein the polymeric substrate is formed from a material selected from the group consisting of polyacrylate, polyester, polystyrene, polyethylene, polypropylene, polyamides, polyamides, polycarbonate, epoxy, phenolic, acrylonitrile-butadiene-styrene, acrylonitrile-styrene-arylates, acetal, and blends thereof.

33. The multifunctional lamp unit of claim 21, wherein the polymeric substrate is formed from a material selected from the group consisting of polycarbonate, poly(2,2'-dihydroxyphenylpropane) carbonate, polydiethyleneglycol bis (allyl carbonate), polymethylmethacrylate, polystyrene, and blends thereof.

34. The multifunctional lamp unit of claim 21, wherein the polymeric substrate includes a pre-coated film in the form of a hardcoat, an inorganic oxide, a thin metal film, or a combination of these pre-coated films.

35. The rearview device of claim 1, further comprising at least two casing parts providing at least one opening or window therebetween for light emitted by the multifunctional lamp unit.

36. The rearview device of claim 1, further comprising a head moveable relative to the vehicle, with the head comprising the at least one casing part.

37. The rearview device of claim 1, wherein the at least one casing part is opaque and the at least one window is transparent.

38. The rearview device of claim 1, wherein the at least one casing part and the at least one window are produced out of plastic in a 2-component injection procedure.

39. The rear view device of claim 37, wherein the at least one window is comprised of clear or tinted polymethylmethacrylate (PMMA) or polycarbonate (PC).

40. The rear view device of claim 37, wherein the at least one opaque casing part is made of acrylonitrile butadiene styrene (ABS), polypropylene (PP) or high-density polyethylene (HDPE).

41. The rearview device of claim 1, wherein at least one clear lens of the multifunctional lamp unit extends along the at least one casing part.

42. The rearview device of claim 1, wherein at least one clear lens of the multifunctional lamp unit is connected to the at least one casing part.

43. The rear view device of claim 36, further comprising at least one of a camera and a reflective element.

44. The rearview device of claim 1, further comprising at least one light decoupling region providing at least one of a blind spot indicator, a warning light, a puddle light, a logo light, a welcome light and an approach light, in addition to a side turn indicator light.

45. The rearview device of claim 1, wherein the projection unit is adapted to function as a side turn indicator light and a logo light, one at a time.

46. The rearview device of claim 1, wherein the at least one casing part is a scalp part.

47. The rearview device of claim 1, wherein the multifunctional lamp unit is mounted to at least one casing part of the rear view device.

48. The rearview device of claim 1, wherein at least one printed circuit board (PCB) of the multifunctional lamp unit is mounted to at least one casing part of the rear view device.

49. The rearview device of claim 1, further comprising a cooling element.

50. The rear view device of claim 49, wherein at least one printed circuit board (PCB) of the multifunctional lamp unit is connected to the cooling element.

51. The rearview device of claim 1, further comprising:
a head moveable relative to the vehicle;
a folding mechanism comprising an actuating unit configured to move the head in a first direction and in a second direction by driving at least one actuator, wherein the head moves in the first direction toward a first position where the rear view device can observe the rear, and the head moves in the second direction toward a second position where the rear view device cannot observe the rear; and a control unit configured to control the multifunctional lamp unit depending on at least one of a state of the actuating unit and a position of the head.

52. The rear view device of claim 51, wherein the control unit is configured to instruct the multifunctional lamp unit to reproduce different light effects depending on a type of movement.

53. The rear view device of claim 51, further comprising a door detection unit configured to detect an on/off-state of a door lock device of the vehicle and to transmit the detected on/off-state to the control unit, wherein the control unit is further configured to instruct the multifunctional lamp unit to reproduce one of predetermined light effects according to the detected on/off-state of the door lock device.

54. The rear view device of claim 51, further comprising a motion detection unit configured to detect a motion state of the vehicle and to transmit the detected motion state to the control unit, wherein the control unit is further configured to instruct the multifunctional lamp unit to reproduce one of predetermined light effects in response to detecting that the vehicle is in motion.

55. The rear view device of claim 51, further comprising a storage unit configured to store one or more light effects, wherein the storage unit is configured to further store information on a list of light effects to be reproduced for each user of the vehicle.

56. The rear view device of claim 51, further comprising at least one error detection unit for detecting an operation error, wherein the control unit is further configured to instruct the multifunctional lamp unit to reproduce one of predetermined light effects in response to the at least one error detection unit detecting an error.

57. The rear view device of claim 51, wherein the projection unit is adapted to project a symbol or a logo onto a road surface in response to the head being in the second position, and the projection unit is further adapted to project a turn signal onto the road surface in response to the head being in the first position.

58. The rear view device of claim 51, wherein the control unit is configured to activate the projection unit to emit at least one of a puddle light, a logo light, a welcome light and an approach light in response to the head being in the second position, and the control unit is configured to activate the projection unit to emit a turn signal in response to the head being in the first position.

59. A method for operating the rear view device of claim 51, comprising producing a light effect using the projection unit depending on at least one of a position and movement of the head.

60. The method of claim 59, further comprising emitting, using the projection unit, at least one of a puddle light, a logo light, a welcome light and an approach light, or at least one of a warning light and a turn signal.

61. The method of claim 59, further comprising changing the light effect produced by the projection unit in response to the head being moved.

62. A vehicle, comprising a rear view device according to claim 51.

63. The vehicle of claim 62, further comprising an input device disposed inside the vehicle and configured to receive an input from a user, wherein a light effect to be reproduced is able to be supplemented or changed according to information inputted to the input device.

64. The vehicle of claim 63, wherein the input device includes at least one of a switch positioned on a dashboard, a touchscreen, a seat memory button, a seat control button, and an orientation control button for the head of the rear view device.

65. The rear view device of claim 43, wherein the camera and the reflective element are arranged within the moveable head.

66. The multifunctional lamp unit of claim 1, wherein the multifunctional lamp unit is a multifunctional side turn indicator lamp unit.

67. The rear view device of claim 35, further comprising a head moveable relative to the vehicle, with the head comprising the at least two casing parts.

68. The rear view device of claim 35, wherein the at least two casing parts are opaque and the at least one window is transparent.

69. The rear view device of claim 35, wherein at least one casing part of the at least two casing parts and one window of the at least one window are produced out of plastic in a 2-component injection procedure.

70. The rear view device of claim 35, wherein at least one clear lens of the multifunctional lamp unit extends along the at least two casing parts.

71. The rear view device of claim 35, wherein at least one clear lens of the multifunctional lamp unit is connected to the at least two casing parts.

* * * * *